United States Patent
Shenoy et al.

(10) Patent No.: US 11,069,010 B1
(45) Date of Patent: Jul. 20, 2021

(54) METHODS AND SYSTEMS FOR CREATING SINGLE PASS OPTIMIZED PROPERTY SEARCH PORTAL

(71) Applicants: Subrao Venugopal Shenoy, San Jose, CA (US); Seema Subrao Shenoy, San Jose, CA (US)

(72) Inventors: Subrao Venugopal Shenoy, San Jose, CA (US); Seema Subrao Shenoy, San Jose, CA (US)

(73) Assignee: TRSOFT, San Jose, CA (US)

( * ) Notice: Subject to any disclaimer, the term of this patent is extended or adjusted under 35 U.S.C. 154(b) by 1072 days.

(21) Appl. No.: 15/597,038

(22) Filed: May 16, 2017

Related U.S. Application Data

(60) Provisional application No. 62/392,109, filed on May 20, 2016.

(51) Int. Cl.
  *G06Q 50/16* (2012.01)
  *G06F 16/951* (2019.01)
(52) U.S. Cl.
  CPC ........ *G06Q 50/163* (2013.01); *G06F 16/951* (2019.01)
(58) Field of Classification Search
  None
  See application file for complete search history.

(56) References Cited

U.S. PATENT DOCUMENTS

| | | | | |
|---|---|---|---|---|
| 5,754,850 | A * | 5/1998 | Janssen | G06Q 30/0601 707/758 |
| 8,024,349 | B1 * | 9/2011 | Shao | G06F 16/3338 707/769 |
| 2006/0190279 | A1 * | 8/2006 | Heflin | G06Q 30/00 705/307 |
| 2010/0063829 | A1 * | 3/2010 | Dupray | G06Q 30/0603 705/313 |
| 2011/0137811 | A1 * | 6/2011 | Patel | G06Q 50/16 705/313 |
| 2013/0222373 | A1 * | 8/2013 | Weinstein | G06F 16/248 345/419 |
| 2013/0339891 | A1 * | 12/2013 | Blumenberg | G01C 21/3694 715/771 |
| 2014/0156540 | A1 * | 6/2014 | Williams | G06Q 50/16 705/306 |
| 2017/0235733 | A1 * | 8/2017 | Florance | G06F 16/29 707/765 |

OTHER PUBLICATIONS

Windermere Real Estate and INRIX debutsearch-by-commute tool, Aug. 2013; www.inman.com (Year: 2013).*
New website allows users to search for Houston homes by commute time; Jun. 2015, www.bizjournals.com (Year: 2015).*
PlanetRE Press Release, "planetRE Releases New LifeStyle Search Features on Socialite Website Platform", Feb. 17, 2016, online at http://www.planetre.com/News/planetRE-Releases-New-LifeStyle-Search-Features-on-Socialite-Website-Platform.html.

* cited by examiner

*Primary Examiner* — Dennis W Ruhl
(74) *Attorney, Agent, or Firm* — One LLP; Joseph K. Liu

(57) ABSTRACT

Methods and system for creating a unique consumer facing property search portal that provides users the ability to key in critical home search criteria and constraints concurrently, including: commute time, school preferences, lifestyle choices, noise tolerance, and others. Results are then displayed in an optimized result render on a user interface display.

12 Claims, 22 Drawing Sheets

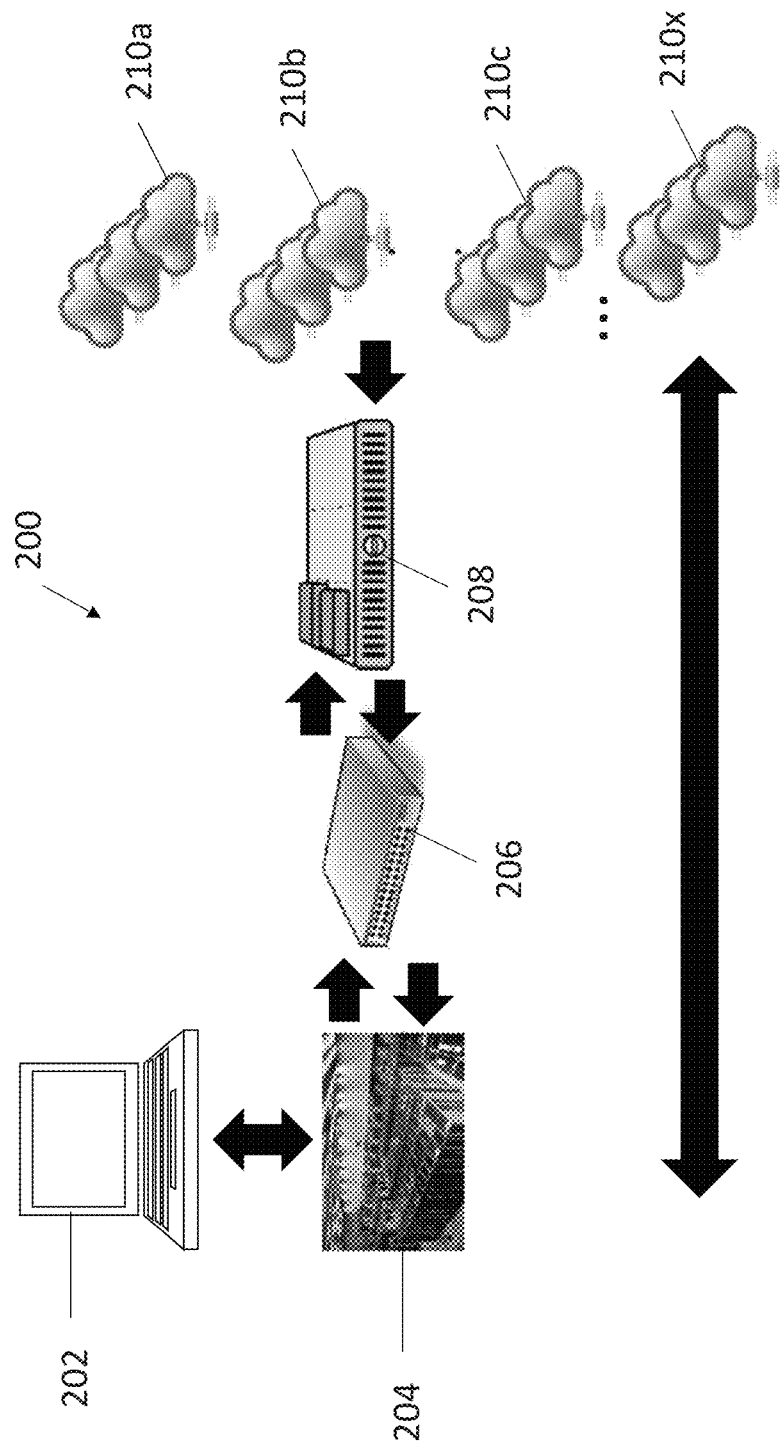

METHODS AND SYSTEMS FOR CREATING SINGLE PASS OPTIMIZED PROPERTY SEARCH PORTAL

CROSS-REFERENCE TO RELATED APPLICATIONS

The present application claims priority to U.S. Provisional Application No. 62/392,109 filed May 20, 2016, which is hereby incorporated by reference in its entirety.

FIELD

The subject matter described herein relates generally to optimizing online search results for a property search using multiple user-selected criteria.

BACKGROUND

Currently, when a consumer wishes to purchase a home, they may visit one of various online websites in order to research homes that are currently available on the market. Examples include home search portals including Realtor.com and Redfin. When the consumer accesses the site, and enters city, bedroom, and bath search information, they are presented with results that are spread on a wide-ranging map with hundreds of results icons and dozens of pages of results showing hundreds of properties. As a result, consumers can often feel overwhelmed and frustrated. This is compounded by the fact that potential buyers do not currently have a simple and intuitive way of researching whether a desirable school district has a school near a shopping plaza or what commuting time or noise levels may be like. The consumer's only real way of researching this is by individually visiting a multitude of resources or by visiting the location. This can be time consuming, resource consuming, and overall cause exhaustion. It can also become very frustrating if one criteria is not met but others are and can lead to many wasted hours.

Further, traditional property search portals are driven predominantly by general location, price, and details of features within the home. Since prior art websites on the market are based on city, zip code, bedroom, and bathroom, they sometimes provide searches with advanced filters to select inside home description like square footage, pool, and others but do not combine internal factors, external factors, and other factors of affordability.

Currently, consumers in home or rental searches will run a first search through a rudimentary website and then run many subsequent filtered iterations in the hope that they will lead to the desired results. This process is highly time consuming and inefficient and fails to produce or even consider any data related to important factors such as utility costs, mortgage, Private Mortgage Insurance (PMI), noise levels in the neighborhood, and others that consumers would find to be valuable.

As such, it would be desirable to have a single pass optimized search tool that allows consumers to set all their requirements and criteria up front for the type of home and quality of life they seek, that produces optimal results in a single pass with only relevant results and omitting any irrelevant results. Additionally, it would be desirable for the portal to present results based on multiple user selected constraints using an intuitive and easy to understand data visualization technique.

SUMMARY

Provided herein are embodiments of systems and methods for enabling consumers to perform simple online home searches that are smooth, intuitive, and efficient. They provide improved results by applying multiple search criteria in a single pass rather than requiring users to perform many frustrating iterations. These systems and methods can be targeted by age group, including to the millennial generation. They allow potential homebuyers to search for homes based on multiple parameters including commute time, nearby schools, and others without wasting time sifting through irrelevant listings.

Home buyer or renters often have specific taste as to what type of home they want to live in. This taste can be comprised of various factors that exist inside a home, such as number of bedrooms, baths, whether there is a fireplace, or others. Also relevant are external factors, such as neighborhood type, noise level, solar scores, commute times, proximity and level of local schools, and others. Other factors are also important, including affordability that can affect and be related to price, rental costs, mortgage payment amounts, insurance payments, taxes, utility costs, and others that make up a total monthly outlay. In a qualitative way, systems and methods described herein match a physical home with a quality of life desired by online visitors while saving valuable time and resources by completing comprehensive searches in a single pass.

In some embodiments, if a specific set of criteria does not result in finding an available home, the systems and methods can provide ongoing search functionality that alerts the user if a home matching the criteria does appear on the market.

The systems and methods described herein are generally operable in an online environment that performs its service via a standalone website or a plugin to currently existing websites, or through mobile user device applications. They allow the visitor to provide one or more criteria to search for homes for purchase, rental, and can also be applied to vacation homes, time shares, and many others. In some embodiments, commercial real estate can benefit from similar functionality.

Various advantages are provided by the aspects disclosed herein, including improved search precision, result relevance, efficiency, and easy to understand data.

The configuration of the systems and methods described herein in detail are only example embodiments and should not be considered limiting. Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 2 shows an example embodiment of an information flow diagram.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Figure 1A:
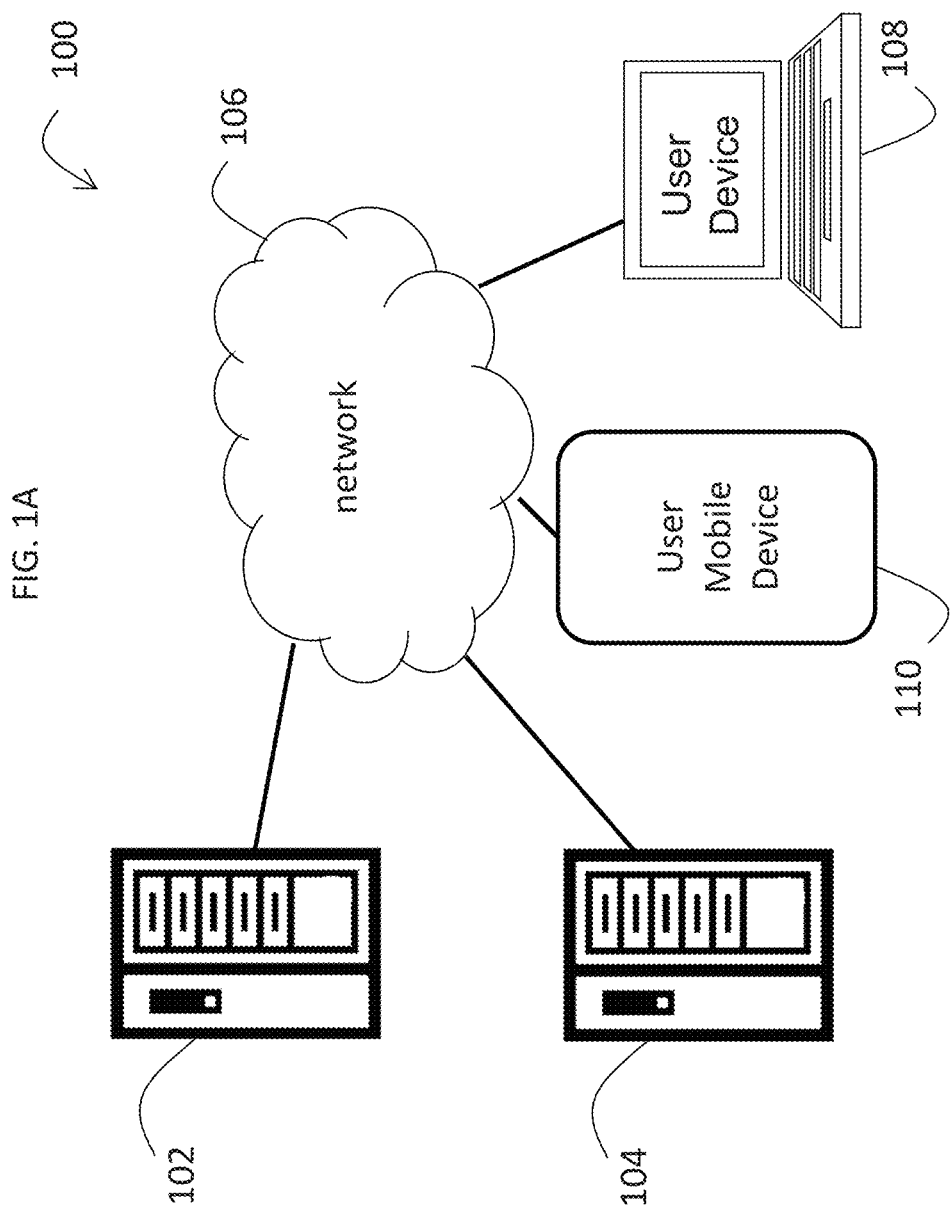
FIG. 1A shows an example embodiment diagram of a system architecture diagram.

FIG. 1A shows an example embodiment diagram of shows an example embodiment diagram of a system architecture 100. As shown in the example embodiment, this can include multiple servers 102, 104 which may include applications distributed on one or more physical servers, each having one or more processors, non-transitory computer readable media memory banks, operating systems, input/output interfaces, and network interfaces, all known in the art, and a plurality of end user devices coupled to a network 106 such as a public network (e.g. the Internet and/or a cellular-based wireless network or other networks) or a private network. User devices 108, 110 can include, for example, mobile devices (e.g. phones, tablets and others) desktop or laptop devices, wearable devices (e.g. watches, bracelets, glasses and others), other devices with computing capability and network interfaces. The server systems can include, for example, servers 102, 104 operable to interface with websites, webpages, web applications, social media platforms, advertising platforms, and others.

Figure 1B:
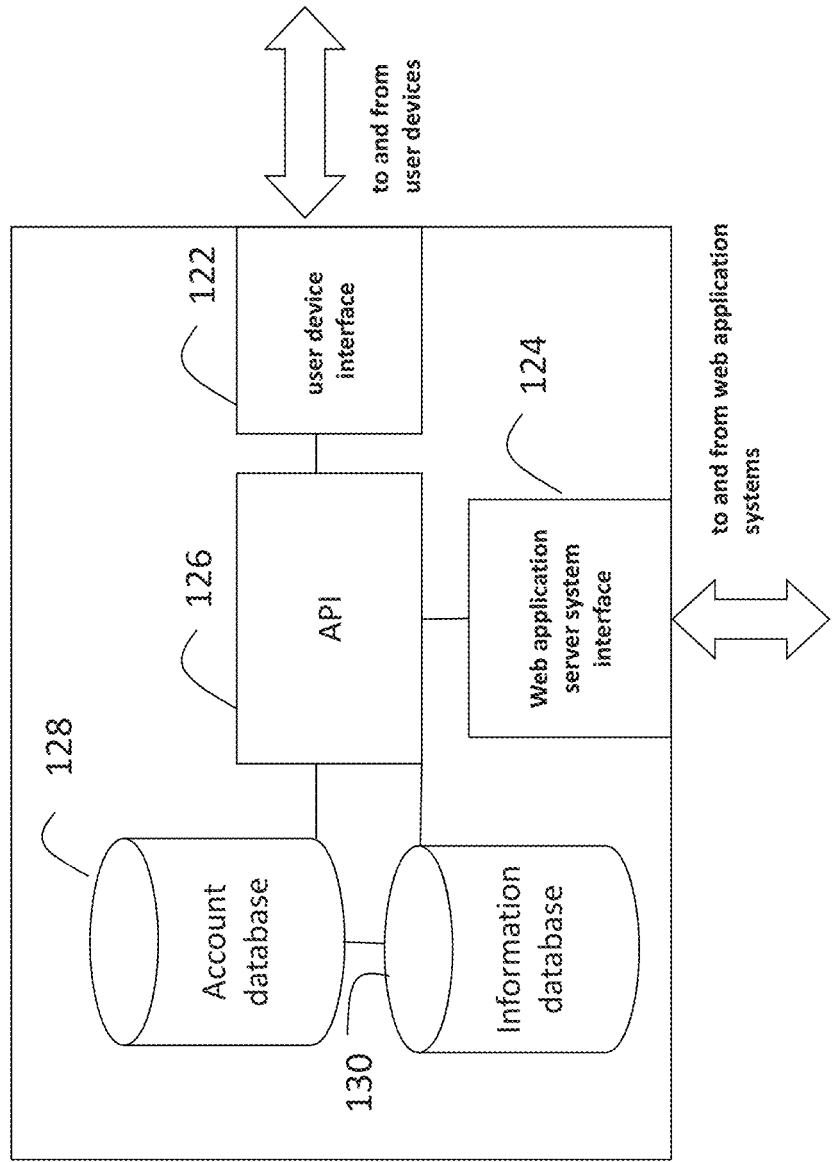
FIG. 1B shows an example embodiment diagram of a server architecture diagram.

FIG. 1B shows an example embodiment diagram of a server architecture 120. As shown in the example embodiment, a server system can include at least one user device interface 122 implemented with technology known in the art for communication with user devices. The server system can include at least one web application server system interface 124 for communication with web applications, websites, webpages, websites, social media platforms, and others. The server system can further include an application program interface (API) 126 that is coupled to at least one database, such as Account database 128, informational database 130 and others and can communicate with interfaces such as the user device interface 122 and web application server system interface 124, or others. API 126 may instruct the databases 128, 130 to store (and retrieve from the databases) information such as link or URL information, user account information, associated account information, or others as appropriate. Databases 128, 130 may be implemented with technology known in the art such as relational databases and/or object oriented databases or others.

Figure 1C:
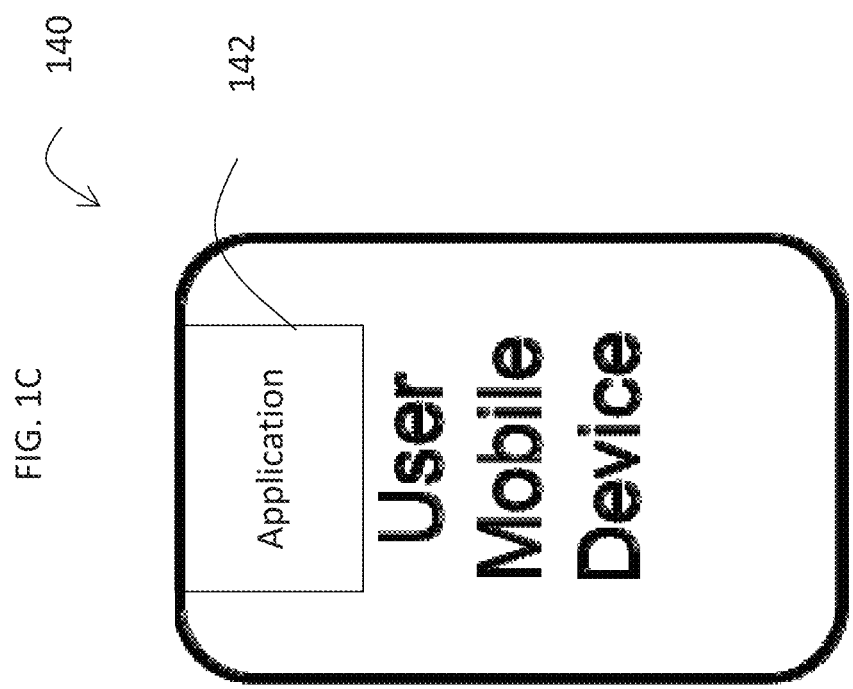
FIG. 1C shows an example embodiment diagram of a user mobile device diagram.

FIG. 1C shows an example embodiment diagram of a user mobile device 140. As shown in the example embodiment, user devices 140 can include a network connected application 142 that is installed in, pushed to or downloaded and stored in non-transitory computer readable memory of the user mobile device 140. In many embodiments user devices are touch screen devices such as smartphones and tablet computers that include one or more processors, operable to execute instructions stored in non-transitory computer readable memory of the device.

FIG. 2 shows an example embodiment of an information flow diagram 200. As shown in the example embodiment, systems that enable a single-pass, lifestyle based, consumer property search can be performed on one of many types of web browsers over a public network (not shown) using a user device 202. Users can log in or anonymously search property listings by entering one or more search constraints via the user device. If users wish to apply multiple constraints, they can be done concurrently in many embodiments. Once constraints are entered, the user can give a command causing user device 202 to connect, via the network, to a web farm 204, which can include one or more servers. Web farm 204 can be communicatively coupled with a data visualization engine 206. Data visualization engine 206 can be communicatively coupled with one or more master databases 208. Master databases 208 can be communicatively coupled with one or more databases 210a, 210b 210c, 210x. Databases 210a-210x can be public, proprietary, or combinations thereof in various embodiments and may contain various types of data, as appropriate. In the example embodiment, database 210a stores lifestyle data, database 210b stores school data, database 210c stores traffic data, and database 210x stores property data. Databases 210a-210x can be organized as a data cloud farm.

The example embodiment provides the ability for users to connect to an aggregated data store of a variety of data types which provide lifestyle information relating to property location. This assembly allows users to pull information through the system from external sources in real-time or substantially close to real-time via one or more networks, including the internet. As such, data can be retrieved, stored, or both with low latency from property databases 210*x*, such as MLS IDX from multiple regions, in addition to databases 210*a*-210*c* and other types of databases. Normalization processes can be elegantly employed using server processors to "scrub" one or more property databases 210*x*. Then, at a later time, this data can be "fused" such that the information from one, multiple, or all databases 210*a*-210*x* is aggregated in a minimal number of feeds or one single feed that can then be processed and prepared for display by data visualization engine 206. Engine 206 can then send the processed data to web farm 204 which can perform any additional processing required before transmitting the data to user device 202 for display. In various embodiments, online or application based user interfaces provide users a rich experience with a wide variety of information.

Figure 3:
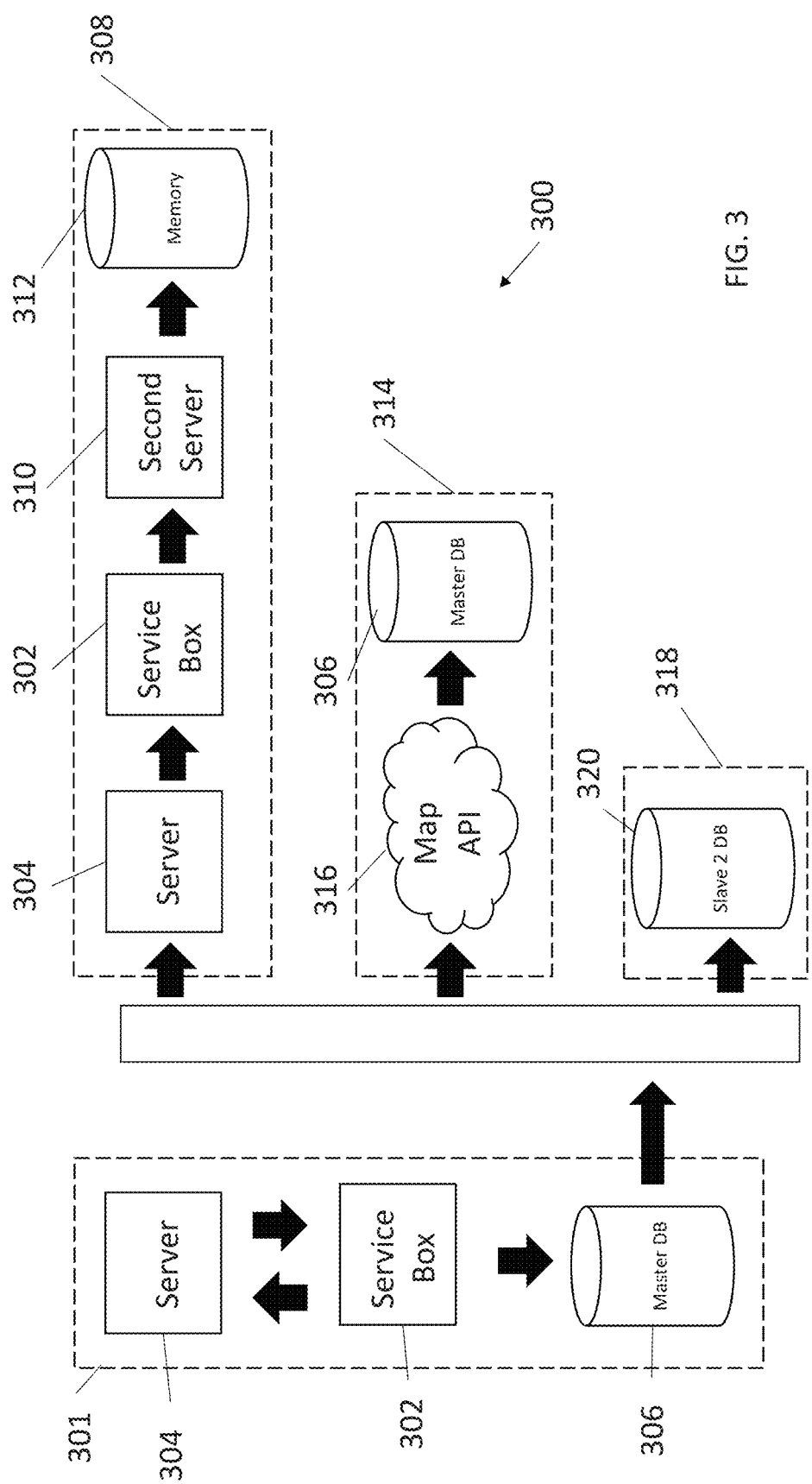
FIG. 3 shows an example embodiment of a property database flowchart diagram showing refreshing, refining, and scrubbing processes.

FIG. 3 shows an example embodiment of a property database flowchart diagram 300 showing refreshing, refining and scrubbing processes. As shown in the example embodiment, an initialization process 301 can be performed before a first step 308, second step 314, and third step 318 are performed. Steps 308, 314, and 318 can be executed in serial format or order, where 308 is executed first, 314 is executed second, and 318 is executed third. After step 318 is executed, a cycle can be complete and the refreshing, refining, and scrubbing processes or services may be temporarily suspended for a period of time, for example, for two minutes. Then the cycle may be repeated.

In initialization process 301, a service box 302 can first send a request for raw data in XML or other formats to a server 304. In some embodiments server 304 can be a RETS server, which is a property database XML standard. Server 304 can then process the request, retrieve the data, and send the requested data back to service box 302, where it can be stored in non-transitory memory. In various embodiments, Service box 302 can be one or more physical machines, virtual machines, or combinations thereof that are operable to run one or more periodic, semi-periodic, or on demand services. These services can include requesting or pulling up to date information from one or more property databases, traffic information databases, or other databases. These requests or information pulls can be performed with low latency, for example fifteen minutes or less. Service box 302 can parse the data and upload it to a master database 306.

First step 308 can include a request or call being received by server 304 for an image, for example, of a property. Images may be in one of various known or later developed formats, such as JPEG. Some properties may have multiple associated images, so multiple calls may be received and processed. Server 304 may then determine whether the image is stored in memory before sending the response to be saved in memory on service box 302. In some embodiments, this can be temporary or permanent storage. Service box 302 can then transmit a request to a second server 310, such as an Azure server, to determine whether second server 310 has previously stored the image in memory 312, such as an Azure blob. If second server 312 has not previously stored the image, then the image can be saved in memory 312.

In some embodiments, pulling images can be performed separately from pulling information from databases. One contributing factor for this practice is that images can include relatively large amounts of data, which can be time and resource consuming. In the example embodiment, image data can be sent to the Azure Blob storage, which can perform internal encryption on the image data. This can help to keep latency low, since pulling images first allows processing of the images to begin before processing of other property related data, especially where data on any new properties may be pulled frequently, such as every fifteen minutes.

Second step 314 can begin with a request being sent to a map API 316, such as a Google API for Google Maps, with a key for geographic coordinates. The system can send these requests frequently, such as each time new property listing data is identified or acquired from a property listing database, an MLS database, or other database. This request may be a for a single property in some embodiments. Once a response is received from Map API 316, it can be stored in master database 306. Master database 306 will generally act as a data repository since geocodes remain unchanged and they can be used and reused as geographic boundary conditions by the system for various different functions.

Third step 318 can include application of any conversions, such as format conversions, that need to be performed, as well as any validations to the data that has been received to ensure that accurate and usable data has been stored. Once completed, this data can be saved from master database 306 to a slave database 320. Validations can be important for a number of reasons. In one example, an MLS agent may inadvertently enter a particular property located in South Africa as having an address in the United States. If not validated, detected, and scrubbed this could cause problems with system mapping software. As such, a geofence or geographic boundary indication on a map visualization produced by the system may show a polygon boundary as extending across the Atlantic Ocean from the northern hemisphere to the southern hemisphere, a confusing and erroneous result. Some MLS systems may receive these types of inadvertent mistakes or garbage data. Another example can include duplicate properties existing in a MLS database, where the same property has been entered into the MLS database by one or multiple agents with multiple MLS numbers. This can also lead to confusing results.

In various embodiments, master and slave databanks or databases can be used to separate information downloading processes, scrubbing processes, and other processes. As such, the master databases can be separate from slave databases that may render timely data to any SQL or other queries generated by one or more of millions of user searches.

A Lifestyle information setup process can be understood with respect to FIGS. 2-3. This process can gather information for display to users. In various embodiments, dates when properties were put on the market are downloaded from one or more source property databases 210*x*. These dates can be downloaded from each source property database 210*x* incrementally, for example, every 15 minutes. This ensures that data is current so that sold properties are no longer found in search results and newly listed properties are accurately represented in search results.

Data representing other types of information relevant to the property listings described herein can be downloaded using XML, an API, or other processes and can be stored in one or more large data storage databases 210*a*-210*c*. Examples of these types of data include noise scores, home utility costs, solar energy friendly scores, walking scores and other external information that is needed in the search from various sources. This data can be stored in different schemas and formats.

Additionally, in the download between first step and second step of FIG. 3 as described previously, pictures or images, which can be high-resolution, can be transmitted to databases, such as NoSQL databases, for quick rendering while other database information can be sent for scrubbing as described herein.

Downloading this information and images can be performed in conjunction with a data fusion process that merges multiple diverse data forms from databases including information related to properties, traffic, schools, lifestyle conditions, and others, in order to create one normalized database query. This data fusion process can be complicated and intricate and in some embodiments is required to be performed in a window of less than fifteen minutes after a new property download or update has occurred. As such, this process should be set up or otherwise prepared to display the most current data within the fifteen-minute window at all times, day or night, seven days a week. Since updating MLS and other data includes a degree of unpredictability, the system should be well constructed in order to display accurate data at all times in order to provide the best user experience possible. For example, when a property image is updated at a source external to the system or a property listing has details modified indicating that it is sold, under contract, delisted, or something else affecting its availability or conditions, the system should be able to account for and accurately represent this data as it is acquired.

Scrubbing can be a process by which bad or erroneous data is eliminated to ensure high quality results, since some property listings may contain redundant or incorrect data or falsified zip and geographic codes, which do not match. This process of scrubbing is important before a merging process is instituted.

After scrubbing, data from information sources 210a-210c and the property listing information are "fused" into one normalized schema that can be delivered to the data visualization engine 206.

Data visualization engine 206 can be a middle ware application layer that connects a navigable searching user interface from web server farm 204. Data visualization engine 206 can also call the presentation layer to the core or master database that contains the fused data from property listings and any other ancillary sources.

Data visualization engine 206 can then be responsible for putting together for display all elements, charts for schools, solar power information scores, commute information, home detail information, and other information to a user in a comprehensive property detail page.

In some embodiments, servers also can pull up daily interest rates from published mortgage sites in order to provide users with accurate information related to current rates. In various embodiments, master databases can store many different types of information, such as projected or recorded utility costs, PMI, mortgage information, and other information affecting the cost of purchasing a specific property. This can be aggregated and used to compute a projected composite cost for purchasing the specific property or home based on conditions that have not traditionally been used in a simple and intuitive fashion. This information can also be explicitly entered or used as constraints for search queries, such that consumers are able to perform highly specialized and personalized searches that may have highly accurate results.

Figure 4A:
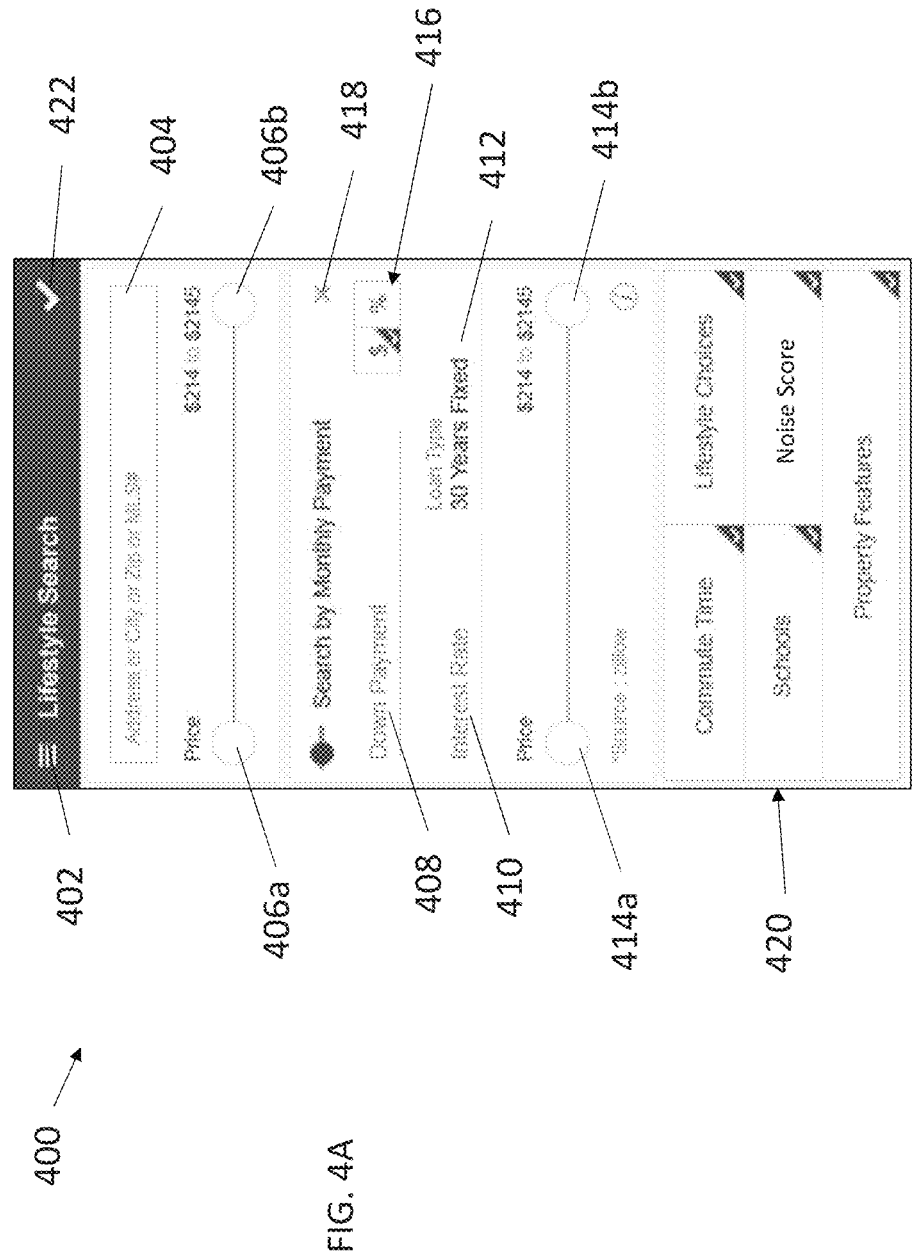
FIG. 4A shows an example embodiment of a sample user interface diagram displaying a lifestyle search functionality as displayed through a mobile user device application.

FIG. 4A shows an example embodiment of a sample user interface diagram 400 displaying a lifestyle search functionality as displayed through a mobile user device application. After downloading the user device application, a user can open it and a loading screen (not shown) will be displayed initially. After the application is loaded the user device can display a Lifestyle Search screen, where the user can search for properties and apply various constraints. These are generally preset options and can include total property price, monthly payment options, and others. In some embodiments, these will be displayed in the alternative, where one is visible at a time. Also, in various embodiments, websites configured for mobile devices can have similar functionality and appearance to diagram 400, without requiring users to download an application.

Diagram 400 shows a plurality of different buttons, sliders, informational displays, and other functionality. A menu button 402 can provide drop down, pop-up, or other menu displays to be shown when selected by a user and can allow the user to navigate to different areas of the application. A search entry field 404 can allow users to search for particular properties, areas, or agents by entering addresses, cities, states, zip codes, MLS numbers, or other pertinent information. Minimum price slider 406a and maximum price slider 406b allow users to adjust their search criteria to a desired price range and can be selected and dragged along a price continuum bar.

As shown in diagram 400 a monthly payment search criteria box can include various related fields and buttons. If desired, users can exit this box by selecting "x" button 418. A Down Payment field 408 can be displayed as a watermark text that, when selected, can migrate upward slightly on the display, change font size, and perform other functionality. For example, field 408 may reduce font size to 2 font sizes smaller and provide room below the text for entering or choosing to preset down payment amounts. Where users are looking for rental properties, timeshare properties, home-sharing properties, or hotel properties on a per night basis, similar functionality can be used to search for appropriate prices and price ranges for time period based total costs. As such, it can appear somewhat like Loan Type information field 412, which shows "30 Years Fixed" has been selected. Users are also able to enter or select desired interest rates in Interest Rate field 410 and adjust monthly payment ranges using minimum monthly payment slider 414a and maximum monthly payment slider 414b, like sliders 406a and 406b described previously. In some embodiments, additional information can be displayed or selected such as the "*Source: Zillow" information. Another example is the "i" icon with the circle around it that is displayed below slider 414b, which can display copyright information or other information if selected by a user.

As shown in the example embodiment, the application can include one or more Lifestyle buttons 420. Examples shown include Commute Time, Lifestyle Choices, Schools, Noise Score Property Features, and others. Selecting one of the buttons 420 can open a Lifestyle page or bring up a display window where users can manipulate related search criteria and select different options. Each Lifestyle page can include controls that allow the user to easily navigate to one or more other Lifestyle pages, map pages, property pages, broker pages, and others, or to go back to previous pages. Buttons 420 can include check marks as shown in diagram 400, allowing users to easily identify those Lifestyle pages that have had data entered or selected previously and which are currently being applied to search results.

Once users have applied the various search criteria that they desire, they can select check mark button 422 and their search criteria will be processed and applied to property data saved or acquired by the system. After the system has generated data on properties matching the search criteria, it can display results in a default view, such as a list view as shown in FIG. 4B.

Figure 4B:
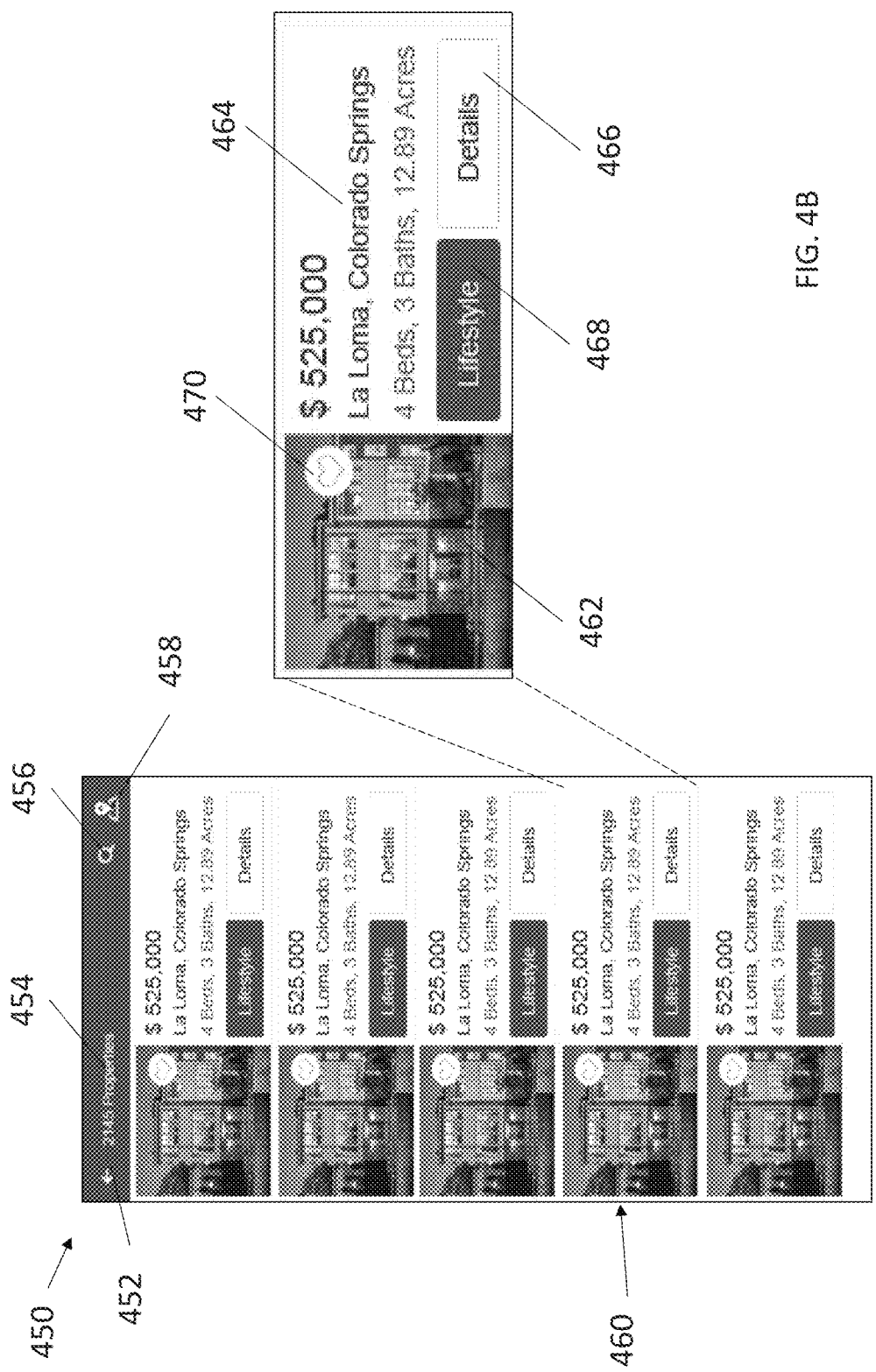
FIG. 4B shows an example embodiment of a sample user interface diagram displaying a gallery view format of a search results page after performing a lifestyle search as displayed through a mobile user device application.

FIG. 4B shows an example embodiment of a sample user interface diagram 450 displaying a gallery list view format of a search results page after performing a search. Diagram 450 shows this list as it can be displayed through a mobile user device application or mobile user device web site.

Users can quickly return to and modify search criteria by selecting a back-arrow button 452. A matching property quantity that the system has found to match the user's search criteria can be displayed in quantity information area 454. Selecting a search icon button 456 can allow users to begin a new search from scratch or modify an existing or previously stored set of search criteria. Selecting a map icon button 458 can display a map view for the user based on their search criteria.

As shown, several property listings can be displayed in a simple, intuitive format that allows users to quickly gather important and relevant information. A property listing 460 can include an image 462, a favorite button 470, and other basic information 464 including price, property name, or others. Favorite button 470 can save the property listing to a favorites list for the user so that they can easily recall and compare properties that they found in on or more searches. Each property listing can include a details button 466 that will display additional property images and information when selected. Each property listing can also include a Lifestyle button 468 that can display information regarding lifestyle content related to the property. Displaying Lifestyle button 468 with each property listing 460, can be beneficial for users since some users may forget about the lifestyle information search functionality, including various criteria, during their initial or subsequent searches. Thus, displaying Lifestyle button 468 with each property listing reminds users about this important and valuable tool at a critical point in the property researching process and can save users time and frustration.

Figure 5:
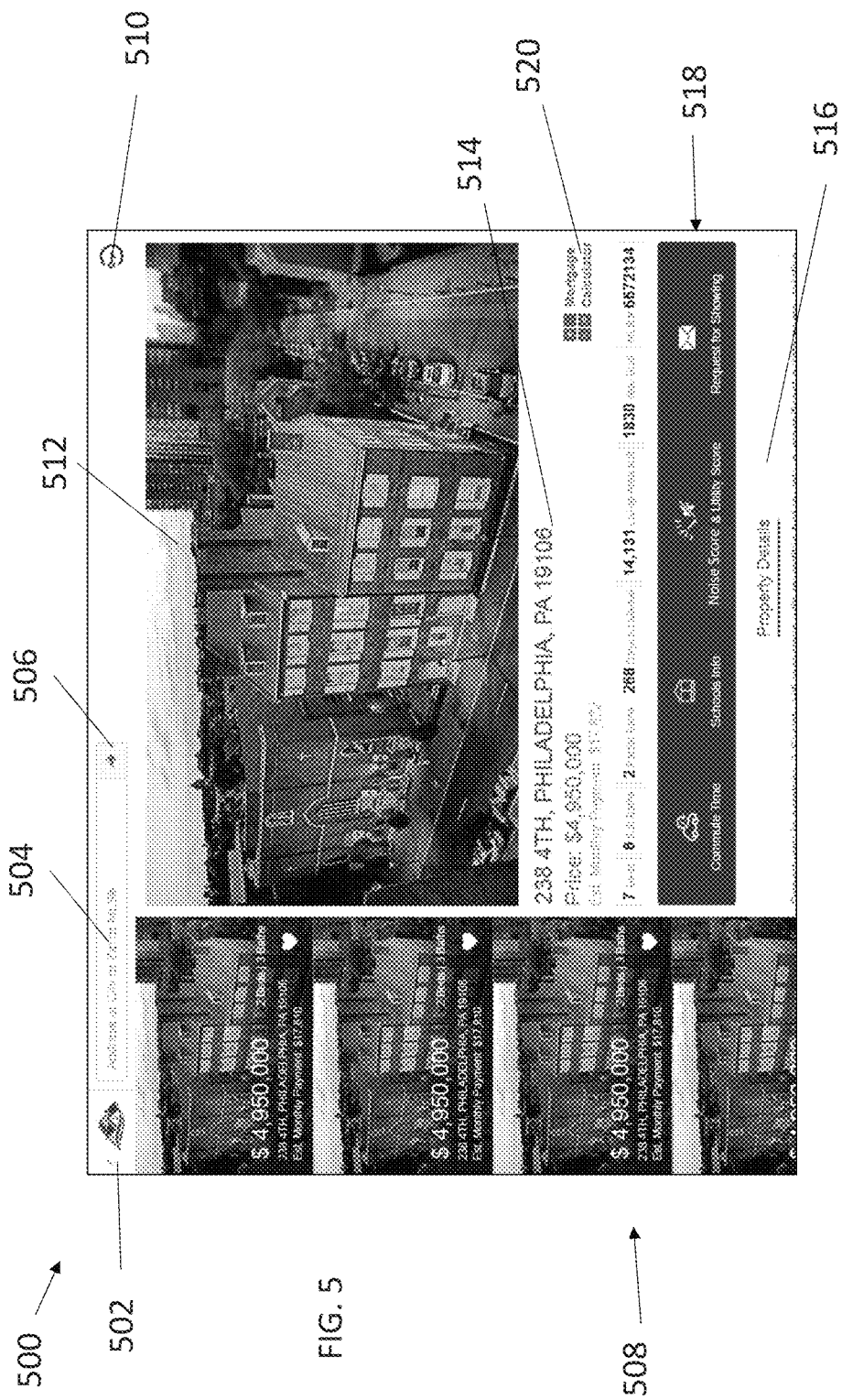
FIG. 5 shows an example embodiment of a sample user interface webpage diagram displaying a lifestyle search results page including converged search information.

FIG. 5 shows an example embodiment of a sample user interface webpage diagram 500, displaying a lifestyle search results page including converged search information. Diagram 500 is an example of how property information including home details can be displayed on a tablet user device. As shown in the example embodiment, users can quickly return to and modify search criteria by selecting a back-arrow button 502. A search entry field 504 can allow users to search for particular properties, areas, or agents by entering addresses, cities, states, zip codes, MLS numbers, or other pertinent information. Searches for information entered in search entry field 504 can be executed by selecting a confirmation arrow 506. Refresh button 510 can perform a refresh of the current page when selected and will reflected any changes or updates to the page since it was previously loaded.

As shown, several property listings can be displayed in a list 508 or other simple, intuitive format that allows users to quickly gather important and relevant information and each property listing in list 508 can include a favorite button. The favorite button can save the property listing to a favorites list for the user so that they can easily recall and compare properties that they found in on or more searches. A selected property listing can include an image 512 of the property, and other basic information 514 including price, estimated monthly payment, property name, address, location, number of bedrooms, number of full and partial bathrooms, number of days on the market, square footage, lot size, year built, MLS number, and others. Each property listing can include also include an informational details field 516 that can display additional property images and more detailed information about the property, neighborhood, and related information.

Property listings can also include one or more buttons 518 that can display information regarding lifestyle content related to the property and other information. As shown, buttons 518 include "Commute Time," "Schools Info," "Noise Score & Utility Score," and "Request for Showing." Commute time button can allow users to view or search for commuting time to an address with customizable features such as "arrive by," "depart at," and time window customization. Schools Info button can allow users to view nearby public and private schools, daycares, colleges, and universities. Noise Score and Utility Score can allow users to view how noisy the location of the property is. This can include showing different times of day, different times of year, during holidays, and other pertinent information. Utility score can factor in how convenient the location is for various activities, such as going to the park, the movies, the grocery store, the liquor store, churches, lakes, or other activities and venues.

A Lifestyle Multiple Search Constraint Process can begin with a user loading an associated searching application or webpage on a user device, such as a desktop, mobile device, or other appropriate device. When the user selects a panel or button for lifestyle information in their web browser or mobile application, they can enter desired search parameters including loans, monthly payment constraint using a default interest setup, and other information. After electing to execute the search, the search process is started by the user.

Figure 6A:
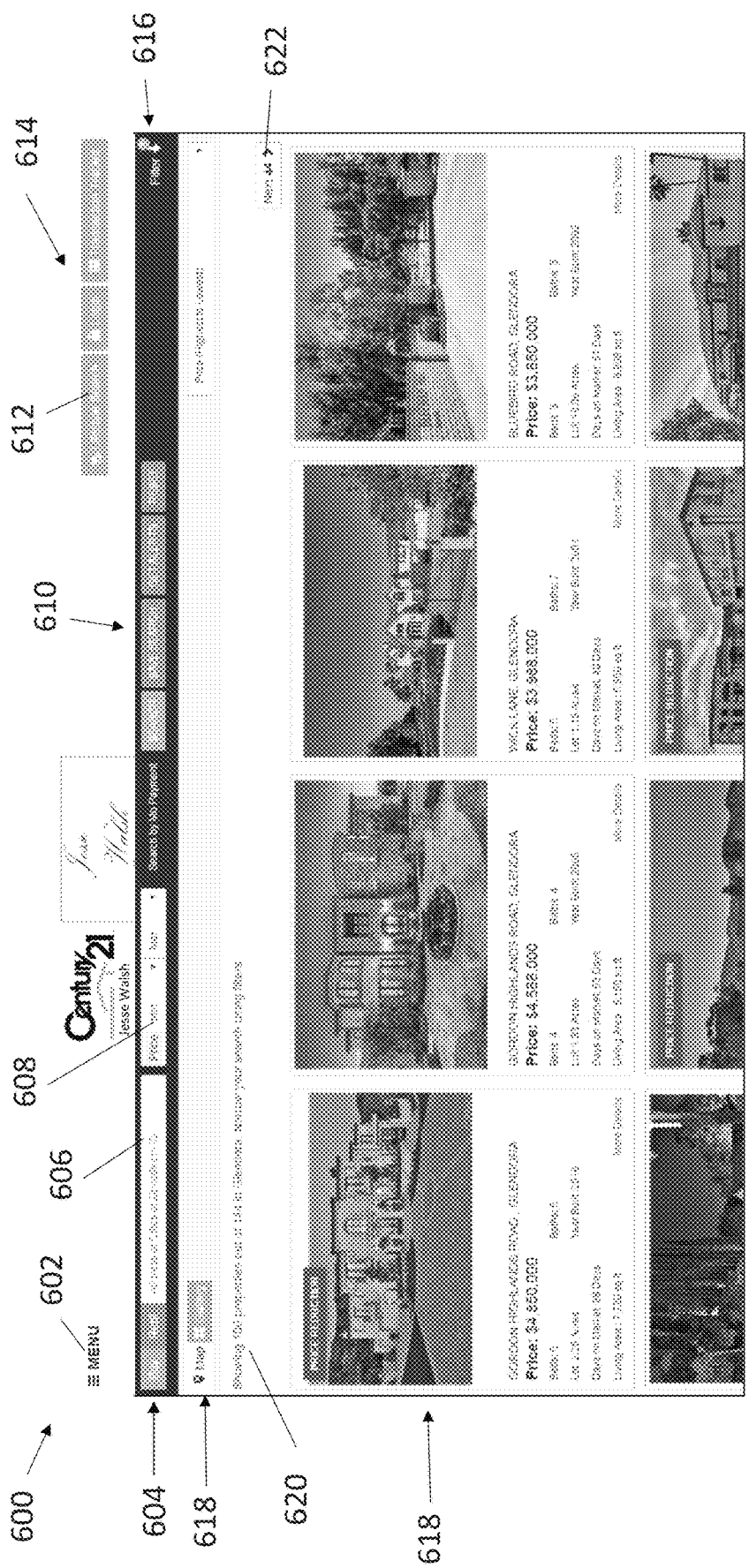
FIG. 6A shows an example embodiment of a sample user interface webpage diagram displaying an initial search results page.

FIG. 6A shows an example embodiment of a sample user interface webpage diagram 600, displaying an initial search results page. As shown in the example embodiment, A menu button 602 can provide drop down, pop-up, or other menu displays to be shown when selected by a user and can allow the user to navigate to different areas of the website. Buy and rent buttons 604 allow users to toggle between or select both options for searches. Alternatively, some users may be attempting to rent a property, timeshare, hotel, motel, home-sharing or other vacation or travel rental, rather than purchase a property.

A search entry field 606 can allow users to search for specific properties, areas, or agents by entering addresses, cities, states, zip codes, MLS numbers, or other pertinent information. In systems with rental functionality, the property can be searched for in primary search bar 606 and instead of a total mortgage payment, their search will be automatically changed and interpreted by the system as a total rent payment, rent payment by period (e.g. per month) or, if total cost is indicated for a rental property that is interpreted as total rent and utility cost, this can be broken down for each cost individually and shown under a property listing detail page. In commercial real estate embodiments, this can be called lease payments or total expenses including triple net rent and can include all other prorated landlord's commercial or office space monthly expense aside from rent. Price fields 608 can include a minimum price dropdown or entry field and a maximum price dropdown or entry field. Price fields 608 allow users to adjust their search criteria to a desired price range. Where users are looking for rental properties, timeshare properties, home-sharing properties, or hotel properties on a per night basis, similar functionality can be used to search for appropriate prices and price ranges for time period based total costs. Search navigation buttons 610 can include a search button that allows users to enter criteria and execute searches, a save search button that allows users to save a current search, a get alerts button that allows users to receive alerts based on selectable criteria, and a reset button that allows a user to remove all current criteria from a search. A Lifestyle Search button 612 allows users to view and select search criteria including Commute Time, Lifestyle Choices, Schools, Noise Score, Property Features, and others. System configuration buttons 614 can include a login button that allows users to login using a user account login and a transaction tracker button that allows users to view past searches.

Figure 6B:
FIG. 6B shows an example embodiment of a sample user interface webpage diagram displaying an initial search results page with a dropdown window that includes a set of Lifestyle search criteria.

A filter button 616 can display a dropdown or other window that includes a set of Lifestyle search criteria, as is discussed further with respect to FIG. 6B. Display modification buttons 618 can allow users to modify how data is displayed on the screen. Display modification buttons can include a map button that brings up a map of properties meeting selected search criteria, described further with respect to FIG. 6C; a gallery button showing a gallery of properties meeting selected search criteria; and a sorting button that allows users to view properties in various formats. These formats can include price from lowest to highest or highest to lowest, acreage from lowest to highest or highest to lowest, year built from oldest to newest or newest to oldest, days on website from oldest to newest or newest to oldest, and others. Current search criteria information 620 can describe what data is currently being displayed, including the number of properties meeting search criteria. Property listing gallery 618 in gallery view shows images and related data for properties meeting search criteria. A next button 622 allows users to navigate to a next page of property listings meeting search criteria.

FIG. 6B shows an example embodiment of a sample user interface webpage diagram 650, displaying an initial search results page with a dropdown window that includes a set of Lifestyle search criteria. As shown in the example embodiment, when a user selects a filter button 616 on an initial user interface screen, as in FIG. 6A, the dropdown filter menu can be displayed over a gallery 618 of property listings. Selecting filter button 616 a second time will hide the dropdown menu. Commute time search box 652 includes various fields and buttons that allow users to filter properties based on commute times for one or more individuals to different addresses, including arrival time and commute duration. This functionality is discussed in further detail with respect to FIG. 7A. Lifestyle choices box 654 includes various selectable buttons 656 that allow users to tailor their search criteria based on lifestyle choices. These can include a culturally rich button, an everyday convenience button, a fun and hip button, a family friendly button, a golfer's paradise button, a health and safety button, a pet friendly button, a shopping button, and other buttons. A school's search box 658 includes buttons and fields that allow users to filter property listing search results based on school district, school name, school score, or other criteria. Each search box 652, 654, 658 includes a clear button that allows users to remove filters for the selected search box.

A property information selection box 662 includes various fields, buttons, and other selectable items that allow users to tailor searches based on property characteristics. These can include property type, short sale, view, foundation, status, foreclosure, style, MLS area, bedroom numbers, price reduced, appliances, senior complex, bathroom number, lot size, heating type, special listing conditions, living area square feet, property age, pool, cooling type, patio, garage/parking, pets allowed, and others.

Figure 6C:
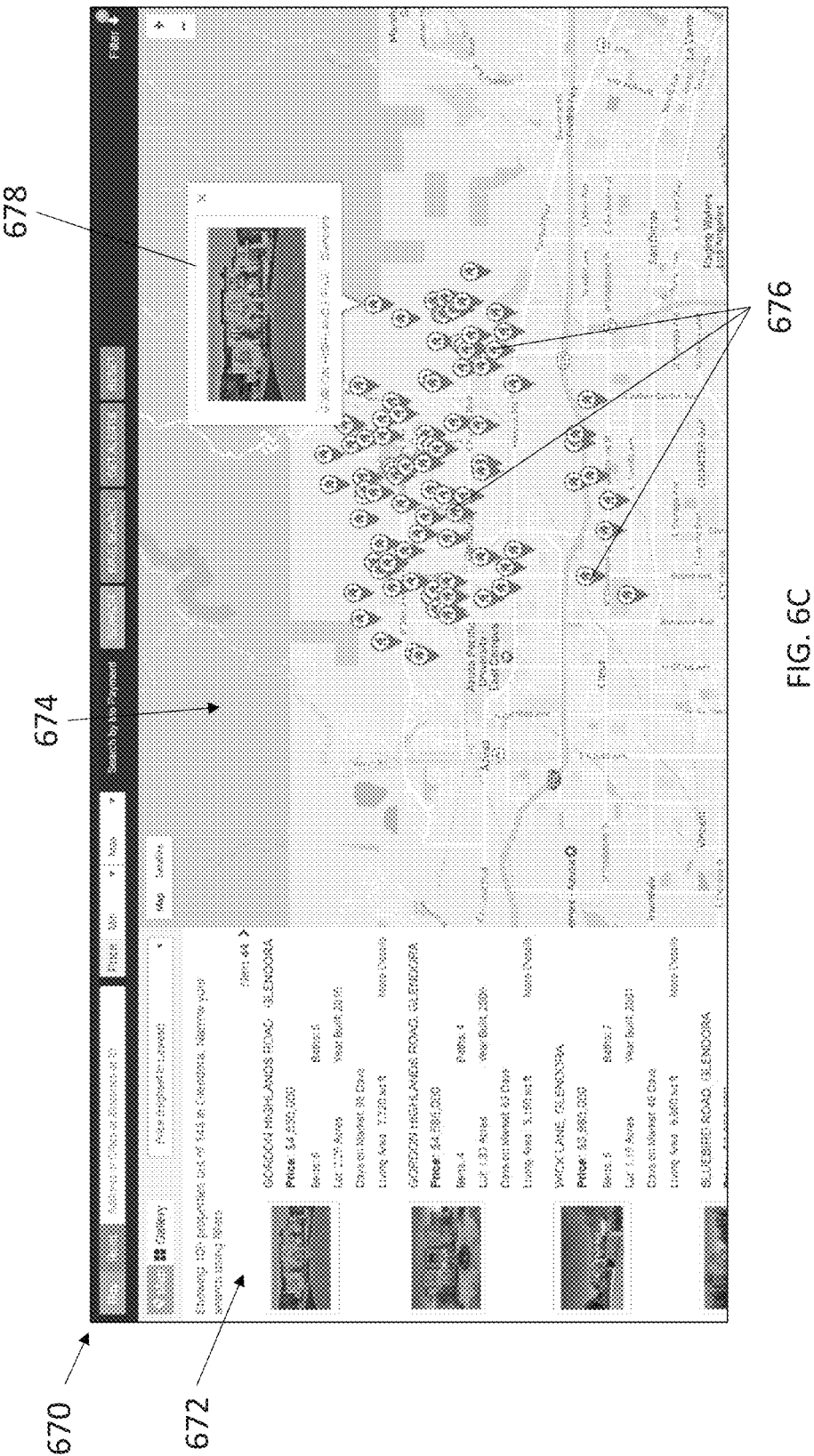
FIG. 6C shows an example embodiment of a sample user interface webpage diagram displaying a map view of search results.

FIG. 6C shows an example embodiment of a sample user interface webpage diagram 670, displaying a map view of search results. As shown in the example embodiment, a property listing list 672 can display property listings for number of properties meeting user-selected search criteria. A map field 676 can allow users to navigate a map that displays indicators 676 of property locations meeting user selected search criteria. If a user selects an indicator 676, then the system can display a truncated version of information for the associated property listing and an image, which can then be selected or closed out using appropriate buttons.

Figure 7A:
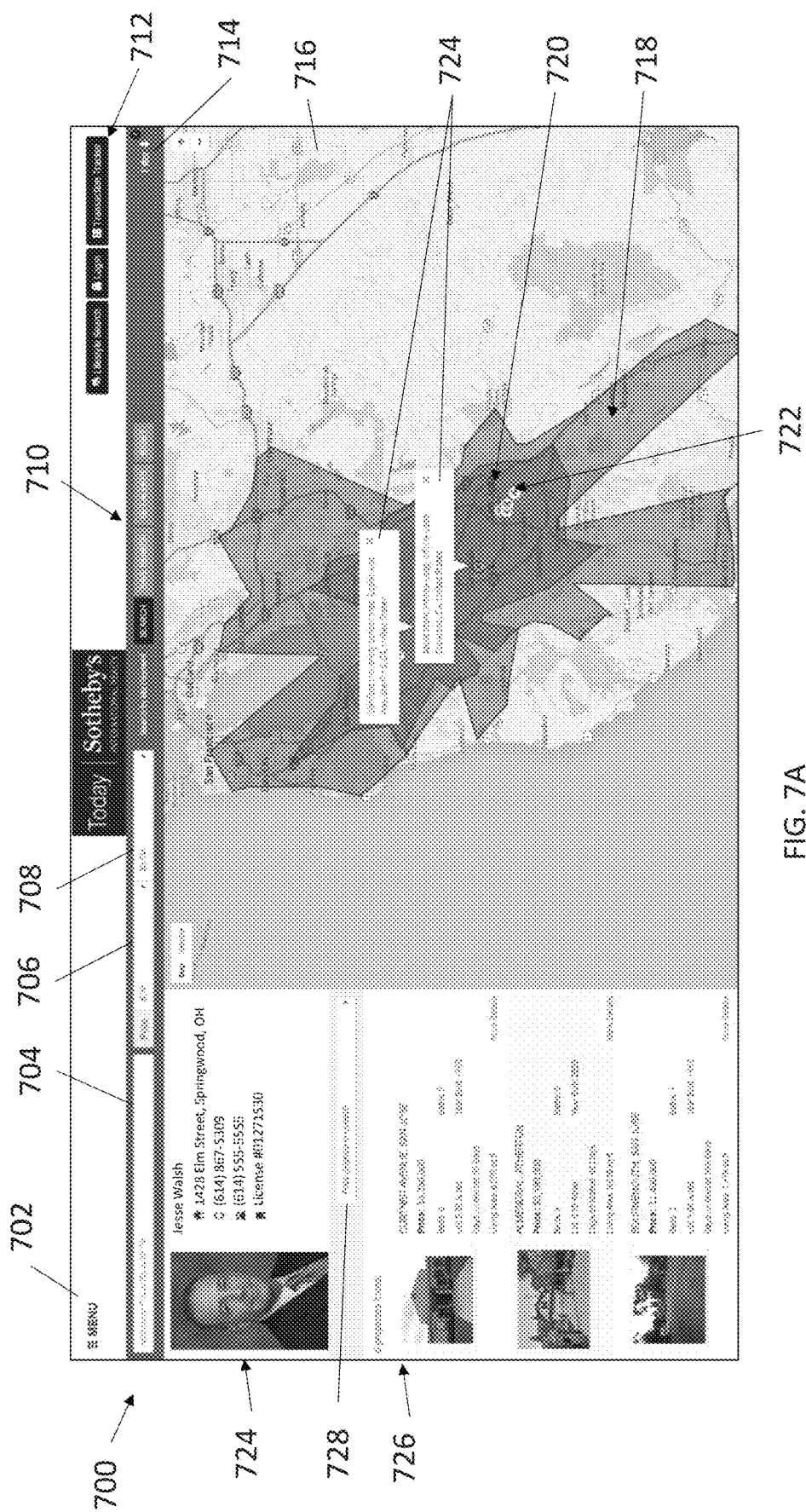
FIG. 7A shows a sample user interface webpage diagram displaying a lifestyle search results page after performing a residential property search on a user device.

FIG. 7A shows a sample user interface webpage diagram 700 displaying a lifestyle search results page after performing a residential property search on a user device. As shown in the example embodiment, a menu button 702 can provide drop down, pop-up, or other menu displays to be shown when selected by a user and can allow the user to navigate to different areas of the website. A search entry field 704 can allow users to search for particular properties, areas, or agents by entering addresses, cities, states, zip codes, MLS numbers, or other pertinent information. Price fields 706, 708 can include a minimum price dropdown or entry field and a maximum price dropdown or entry field. Price fields 706, 708 allow users to adjust their search criteria to a desired price range or a total cost of ownership price range. As such, the minimum and maximum drop down menus can allow users to change price ranges to reflect a projected total cost of ownership range that reflects what they believe they can afford. This range can factor in various projections, including a monthly payment amount, PMI amount, property taxes as a prorated value on a per month basis, Utility costs, and other contributing factors. Where users are looking for rental properties, timeshare properties, home-sharing properties, or hotel properties on a per night basis, similar functionality can be used to search for appropriate prices and price ranges for time period based total costs. Additional information related to this functionality is disclosed herein with respect to FIG. 12 and its associated description. Once this data is aggregated and used to create a composite number or range, it can be used as a constraint and, after a search is performed, this information can be shown on a property detail page a breakdown for all homes that appear as matching search results. In some embodiments, price ranges can also be adjusted and applied to reflect costs of searchable vacation rentals, time shares, hotel rentals, extended stay property rentals, or various other datasets with many contributing cost factors that include stated prices and hidden, nonobvious, or otherwise contributing price factors. In some embodiments, these factors can also include price projections for other factors such as transportation, heating or cooling cost, cost of living, projected entertainment costs, and others.

Search navigation buttons 710 can include a search button that allows users to enter criteria and execute searches, a save search button that allows users to save a current search, a get alerts button that allows users to receive alerts based on selectable criteria, and a reset button that allows a user to remove all current criteria from a search. System configuration buttons 712 can include a login button that allows users to login using a user account login, a transaction tracker button that allows users or agents to view current transactions, and a Lifestyle Search button allows users to view and select search criteria including Commute Time, Lifestyle Choices, Schools, Noise Scores, Property Features, and others. A filter button 714 can display a dropdown or other window that includes a set of Lifestyle search criteria Agent information field 724 can display an agent image, name, address, phone number, fax number, license number, and other relevant information. Property listing list 726 can include a listing of properties matching a set of user selected search criteria. Organization field 728 can allow users to sort information to their preference. Map field 716 can include a geographic map of a desired area.

As shown commute and other constraints can be shown in map field 716. A first constraint effect polygon 718 can be shaded a first color and a second constraint effect polygon 720 can be shaded a different color. Overlapping areas of polygons 718, 720 is where properties that meet both constraints occur. In the example embodiment, constraints have been selected relating to commutes two buyers. These results are displayed as polygons 718, 720 and define a geographic code boundary of the overlapping area for the polygons This intersection and overlapping of polygons 718, 720 shows a common area and can be used as and considered a geofence.

After determining the overlapping area as a geofence, a system data visualization engine can insert property icons 722 matching these constraints, as well as any additional constraints that have been selected by the user, such as bedroom and bathroom numbers, noise rating, solar rating, and other multi-variate constraints within the intersected and overlapping polygon area.

Figure 7B:
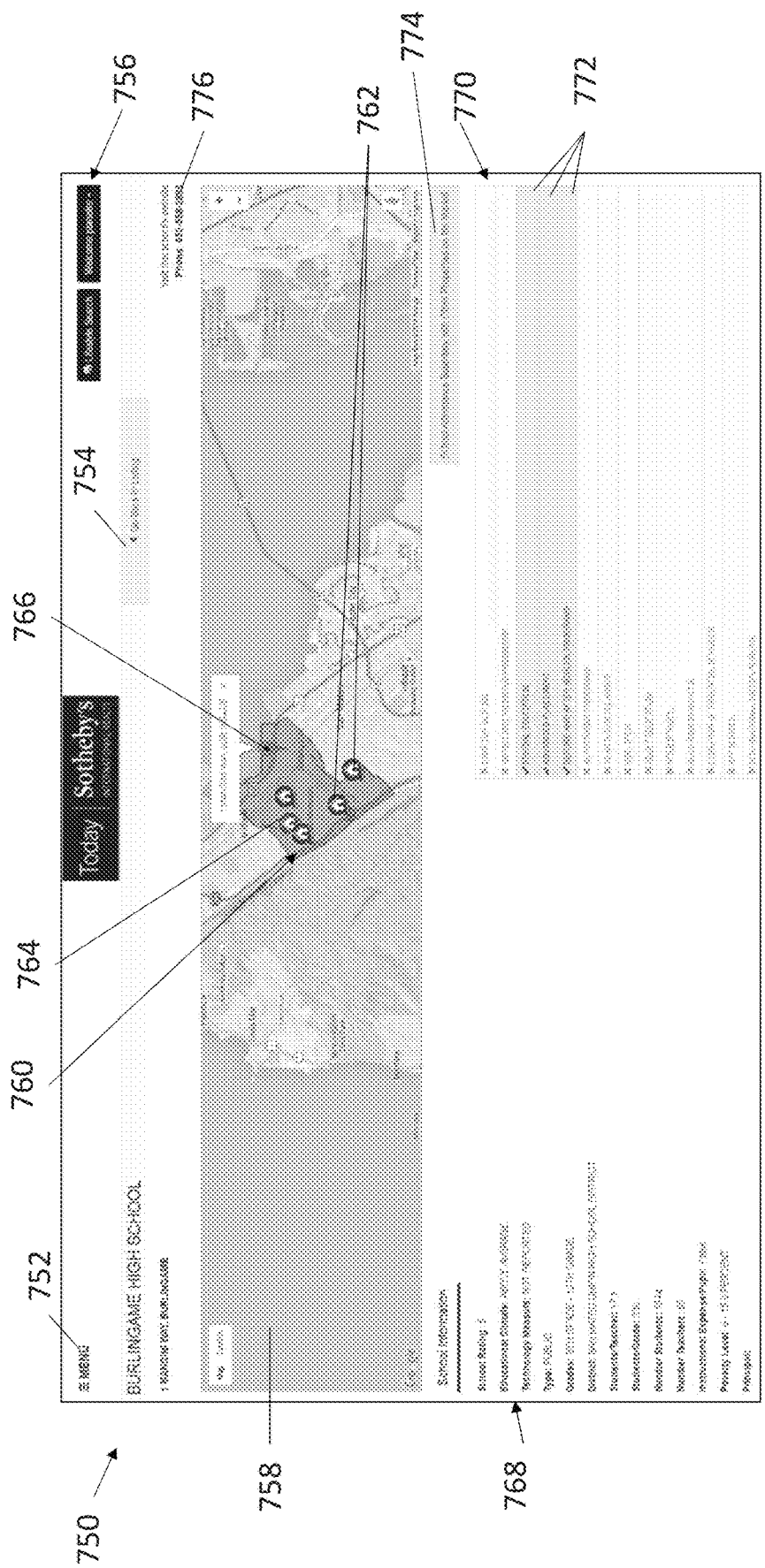
FIG. 7B shows an example embodiment of a sample user interface webpage diagram displaying a lifestyle search results page showing school boundaries on a user device.

FIG. 7B shows an example embodiment of a sample user interface webpage diagram 750 displaying a lifestyle search results page showing school boundaries on a user device. As shown in the example embodiment, a menu button 702 can provide drop down, pop-up, or other menu displays to be shown when selected by a user and can allow the user to navigate to different areas of the website. A back to listing button 754 allows users to return to a previous screen. System configuration buttons 756 can include an account button that allows users to view their user account and a Lifestyle Search button allows users to view and select search criteria including Commute Time, Lifestyle Choices, Schools, Noise Score, Property Features, and others.

Map field 758 can include a geographic map of a desired area. Constraints shown have been user selected regarding school districts. A school district covering a listing address identifier 766 is shown as shaded area 760. Each school in the district is shown by an icon 762 and a selected school 764 has information shown in school information field 768. School information field 768 can display information including a school rating, educational climate, technology measure, type, grades, district, student/teacher ratio, number of students per grade, total number of students, number of teachers, instructional expense per student, poverty level, contacts, and other information. In various embodiments, information can be gathered from third parties, can be proprietary, and can be paid or free.

Criteria field 770 allows users to select criteria that are important to them and results in high quality search results. As shown, several user selected criteria 772 are indicated by shading and check marks. Non-selected criteria are shaded differently and have x marks. Criteria can include charter school, gifted and talented programs, special education, advanced placement, before and after school programs, alternative programs, year-round classes, vocational programs, technology programs, adult education, NCLB schools, Blue Ribbon Schools, Coalition of Essential Schools AYP Schools, International Baccalaureate programs, and others. Additional information can be displayed in other fields 774, such as school attendance boundary with other properties on the market. Informational field 776 can display information such as school websites and phone numbers.

Single Pass Optimization processes provide unique advantages over existing search functionality in the prior art. The systems and methods described herein include a number of variables and can include combinations of discrete and continuous variables. Examples of discrete variables include school ratings, school names, lifestyle tags and others. Examples of continuous variables include traffic patterns affecting commute time and others that can change continuously over time.

In some embodiments, optimization processes can be instituted by an optimization engine that executes the optimization process. This process can include several steps, which will now be described.

As a first step, the system can store one or more user selected constraints on one or more variables they are associated with. For example, constraints for commute can be expanded to more than one constraint and may be associated with a number of different variables. These constraints are stored in an initial database, which can be a SQL database. This database can be used both in initialization and in incremental phases of subsequent searches.

Next, the system is operable to read and analyze continuous real-time traffic data for a selected region and apply sampling to a class of functions with a technique similar to a Discrete Fourier Transform, which is zero outside of a finite region of frequencies. The system is able to intuitively map a continuous function to a discrete sequence and then extract it back to a continuous function with the fidelity of the original samples.

Once the discrete sequence is mapped, discrete values from the sequence are used as a superset search for user constraints to be worked upon for commute. For example, where a user includes commutes for two individuals, these can both be used to filter property data.

This commute constraint can be used as a geofence or bounding box for the property listing search, as shown with the display of multiple polygons in FIG. 7A.

Intersection of multiple polygons can be used as a working space for the search results, providing optimized output by the system. As such, in some embodiments, it is important to establish these polygons before using other constraints to filter data. While FIG. 7A shows two polygons, one each for a first and second individual, more than two polygons can also be implemented and commute data could be used for work, the gym, church, the grocery store, and many other locations and destinations.

In some embodiments, implementing a school district constraints with its own geo code boundary or geofence and commute constraints with its own geofence, conflicts can be created. Therefore, in some embodiments implementing both types may be limited or not allowed by the system.

Once the geofencing has been implemented as described above, the process can continue and the system will rapidly read the additional user constraints. These constraints can trigger properties as being appropriate based on preset tags on the properties on one or more MLS databases based on multiple attributes as shown in FIG. 8.

Once appropriate properties have been identified, the system can display these matching properties as icons within the intersected or overlapping polygons in map view as shown in FIG. 7A and show them as listings in gallery or other views as shown in FIG. 5.

Figure 8:
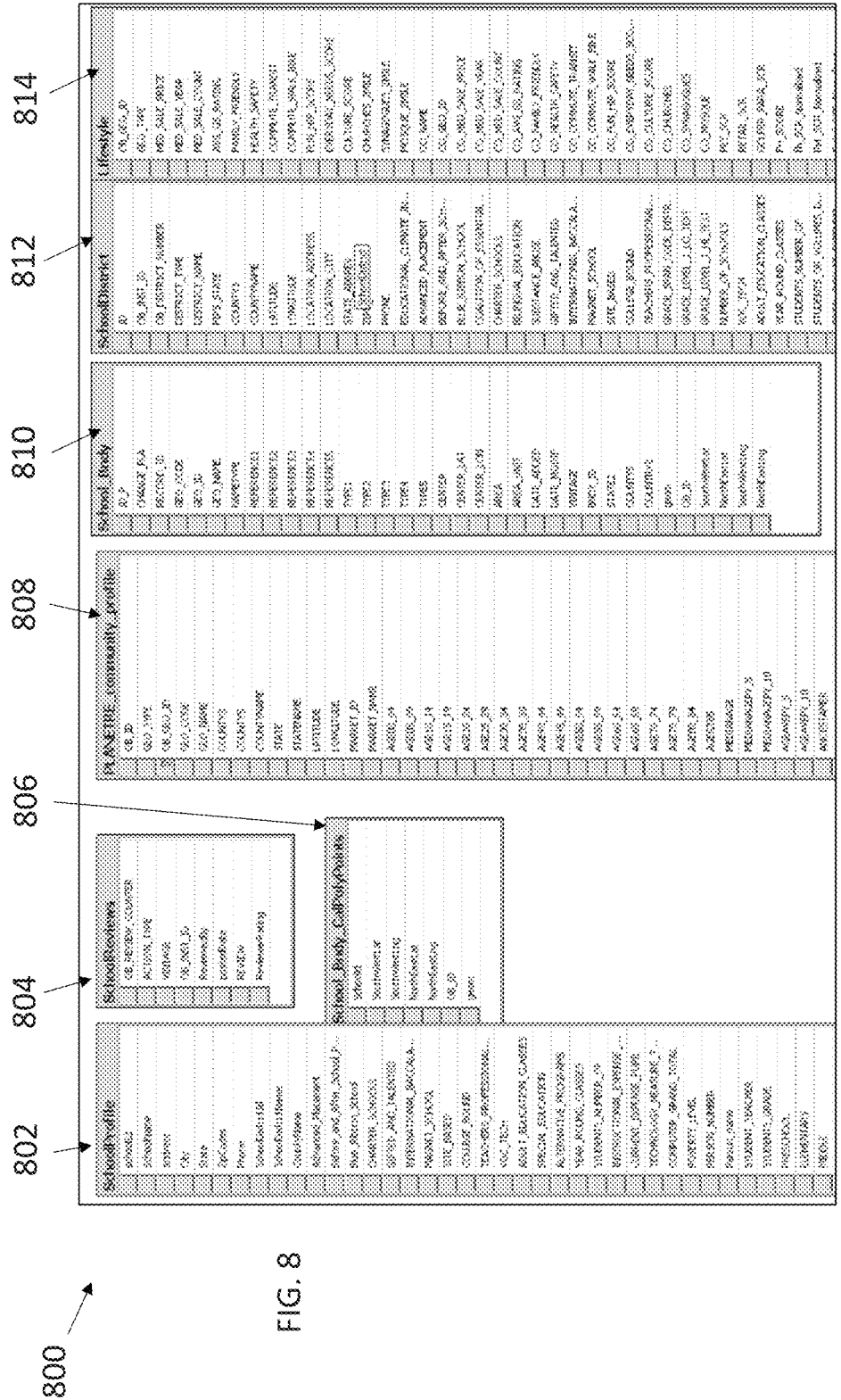
FIG. 8 shows an example embodiment of a schema diagram showing stored school data.

FIG. 8 shows an example embodiment of a schema diagram 800 showing stored school data. As shown in the example embodiment, various school related data can be stored in different groups, including: School Profile 802, School Reviews 804, School_Bndy_CalPolyPoints 806, Community Profile 808, School_Bndy 810, School District 812, and Lifestyle 814.

School Profile 802 can include: school id, school name, address, state, zip codes, phone, school district id, school district name, county name, advanced placement, before and after school programs, Blue Ribbon Schools, charter schools, gifted and talented programs, international baccalaureate, magnet schools, site based, college bound, teachers professionalism, vocational technology, adult education, special education, alternative programs, year round classes, number of students, instructional expense per student, current expenses per pupil, technology measure, computer grand total, poverty level, number of people, names, student teachers, students grades, preschool, elementary, middle school, high school and others.

School Reviews 804 can include: ob review counter, action type, vintage, ob inst id, reviewed by, posted date, review, reviewer rating, and others.

School_Bndy_CalPolyPoints 806 can include: school id, southwest latitude, southwest longitude, northeast latitude, northeast longitude, ob id, geom, and others.

Community Profile 808 can include: ob id, geo type, ob geo id, geo code, geo name, county, country, county name, state, state name, latitude, longitude, market id, market name, age 0-4, age 5-9, age 10-14, age 15-19, age 20-24, age 25-29, age 30-34, age 35-39, age 40-44, age 45-49, age 50-54, age 55-59, age 60-64, age 65-69, age 70-74, age 75-79, age 80-54, age over 85, median age, median ages, average ages, and others.

School_Bndy 810 can include: id p, change fla, record id, geo code, geo name, name type, references 1-5, types 1-5, center latitude, center longitude, area, area units, date added, date modified, vintage, bndy id, state 2, county, country, geom, ob id, southwest latitude, southwest longitude, northeast latitude, northeast longitude, and others.

School District 812 can include: id ob inst id, ob district number, district type, district name, fips state, county, county name latitude, longitude, location address and city, state abbreviation, zip code, phone number, education climate, advance placement, before and after school programs Blue Ribbon School, Coalition of Essential, Charter Schools, bilingual education, substance abuse programs, gifted and talented education programs, International Baccalaureate, magnet school, site based, college bound, teaches professional, grade span code district grade level lo, grade level high, number of schools, vocational technology, adult education classes, year round classes, number of students, students or volumes, total dollar expenditures, and others.

Lifestyle 814 can include: ob geo id, geo type, median sale price, median sale year, median sale count, average gs rating, family friendly, health and safety, commute transit, commute walk bike, fun hip score, everyday needs score, churches within two miles, synagogues within two miles, mosques within two miles, county name, county geo id, county median sale count, county average gs rating, county family friendly, county health and safety, county commute transit, county commute walk bike, county fun hip score, county everyday needs score, county churches within two miles, county synagogues within two miles, county mosques within two miles, pet score, retail score, golfer paradise score, fh score, fh score normalized, pet score normalized, retail score normalized, and others.

Figure 9:
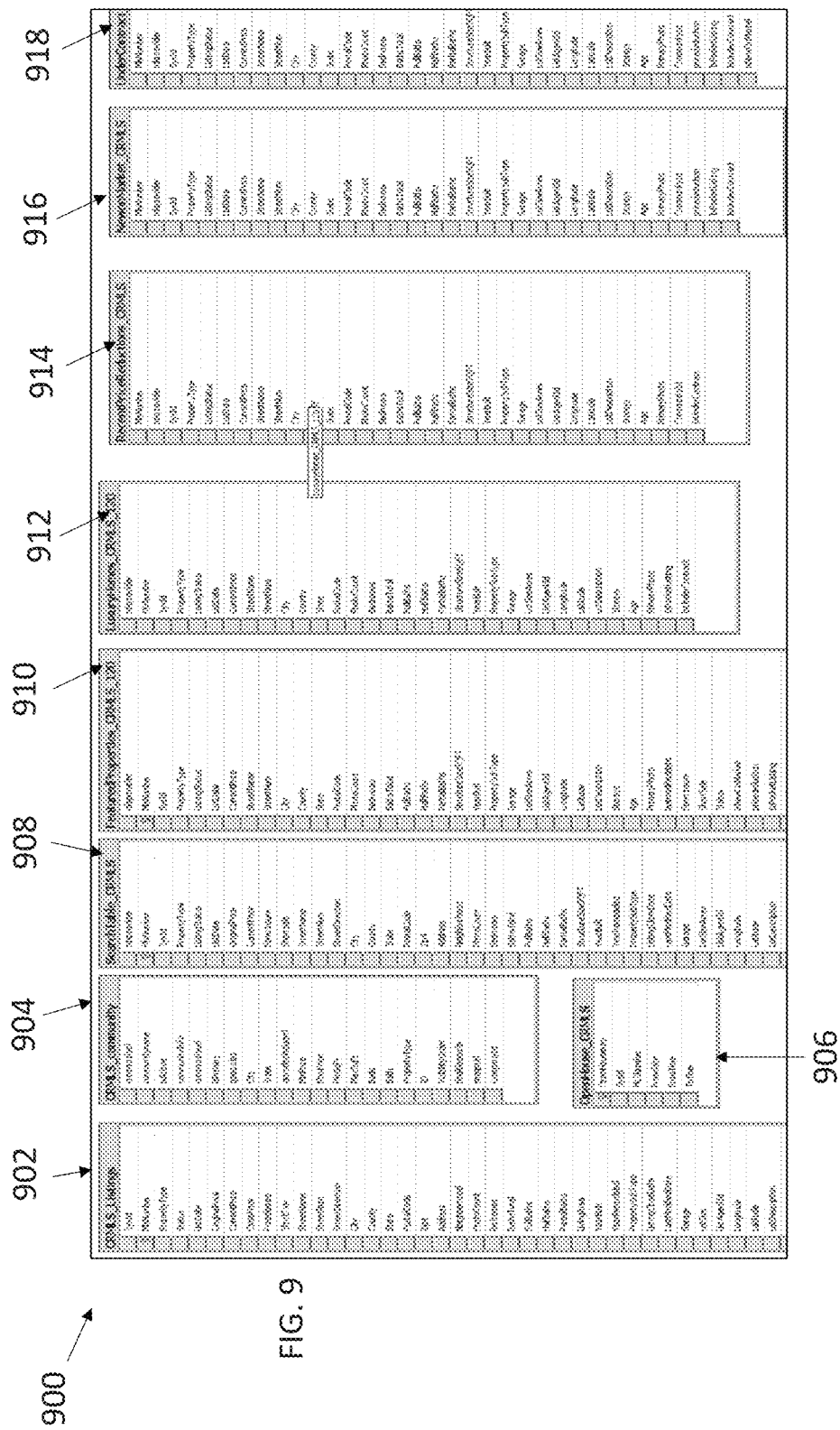
FIG. 9 shows an example embodiment of a slave database schema diagram storing residential properties.

FIG. 9 shows an example embodiment of a slave database schema diagram 900 storing residential properties. As shown in the example embodiment, various school related data can be stored in different groups, including: CRMLS Listings 902, CRMLS Community 904, Open House CRMLS 906, Search Table CRMLS 908, Featured Properties CRMLS120 910, Luxury Homes CRMLS120 912, Recent Price Reduction CRMLS 914, New on Market CRMLS 916, Under Contract 918, and others. As described herein, the example embodiments can include various MLS databases and other databases. CRMLS is an example that is a commercial MLS database in Los Angeles, Calif.

CRMLS Listings 902 can include: system id, MLS number, property type, status, list date, original price, current price, close price, foreclosure, short sale, street name, street number, street direction, city, county, state, postal code, zip code, address, neighborhood, photo count, bedrooms total baths, full baths, half baths, partial baths, living area, year built, year remodeled, property sub type, listing close date, last modified date, garage, lot size, list agent id, longitude, latitude, lot description, and others.

CRMLS Community 904 can include: open house key, system id, MLS number, from date, from time, to time, and others.

Open House CRMLS 906 can include: community id, community name, is active, community info, community url, is primary, geocodes, city, state, zip codes included, minimum price, maximum price, minimum square footage, maximum square footage, beds, baths, property type, id, visibility order, final geocode, image url, company id, and others.

Search Table CRMLS 908 can include: MLS provider, MLS number, system id, property type, listing status, listing date, original price, current price, close price, foreclosure, short sale, street name, street number, street direction, city, county, state, postal code, zip code, address, neighborhood, photo count, bedrooms, total baths, full baths, half baths, partial baths, living area, year built, year remodeled, property sub type, listing close date, last modified date, garage, lot size, list agent id, longitude, latitude, lot description, and others.

Featured Properties CRMLS120 910 can include: MLS provider, MLS number, system id, property type, listing status, listing date, current price, street name, street number, city, county, state, postal code, photo count, bedrooms, total baths, full baths, half baths, partial baths, structure size square footage, year built, property sub type, garage, lot size acres, list agent id, longitude, latitude, lot description, stories, age, primary photo, last modified date, foreclosure, short sale, status, is new on market, price deduction, is pocket listing, and others.

Luxury Homes CRMLS120 912 can include: MLS provider, MLS number, system id, property type, listing status, listing date, current price, street name, street number, city, county, state, postal code, photo count, bedrooms, total baths, full baths, half baths, partial baths, structure size square footage, year built, property sub type, garage, lot size acres, list agent id, longitude, latitude, lot description, stories, age, primary photo, is pocket listing, is under contract, and others.

Recent Price Reduction CRMLS 914 can include: MLS provider, MLS number, system id, property type, listing status, listing date, current price, street name, street number, city, county, state, postal code, photo count, bedrooms, total baths, full baths, half baths, partial baths, structure size square footage, year built, property sub type, garage, lot size acres, list agent id, longitude, latitude, lot description, stories, age, primary photo, community id, is under contract, and others.

New on Market CRMLS 916 can include: MLS provider, MLS number, system id, property type, listing status, listing date, current price, street name, street number, city, county, state, postal code, photo count, bedrooms, total baths, full baths, half baths, partial baths, structure size square footage, year built, property sub type, garage, lot size acres, list agent id, longitude, latitude, lot description, stories, age, primary photo, community id, price reduction, is pocket listing, is under contract, and others.

Under Contract 918 can include: MLS provider, MLS number, system id, property type, listing status, listing date, current price, street name, street number, city, county, state, postal code, photo count, bedrooms, total baths, full baths, half baths, partial baths, structure size square footage, year built, property sub type, garage, lot size acres, list agent id, longitude, latitude, lot description, stories, age, primary photo, community id, price reduction, is pocket listing, is under contract, is new on market, and others.

Figure 10A:
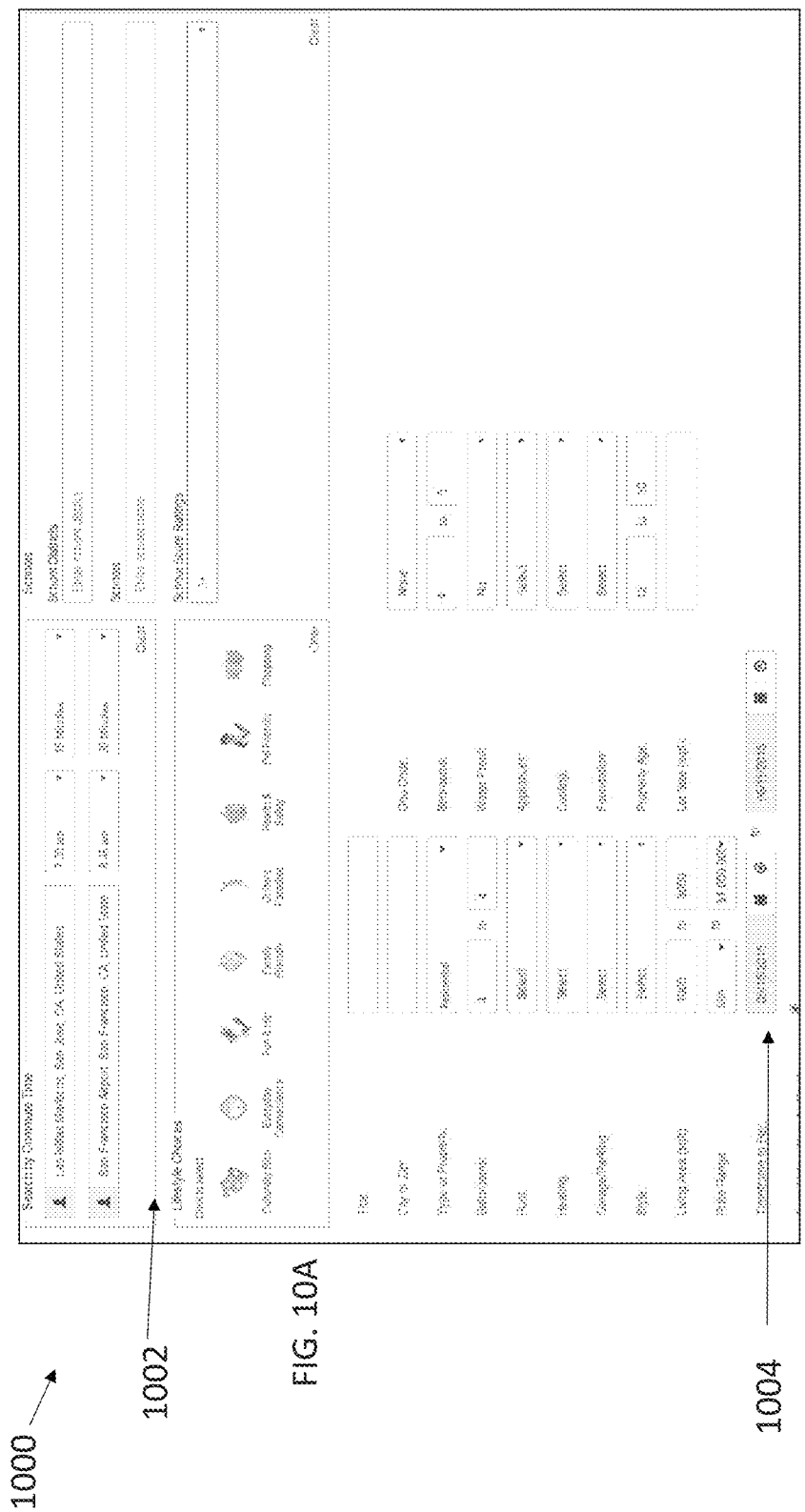
FIGS. 10A-10B show an example embodiment of a sample user interface webpage diagram displaying a dropdown window that includes property alert settings.
Figure 10B:
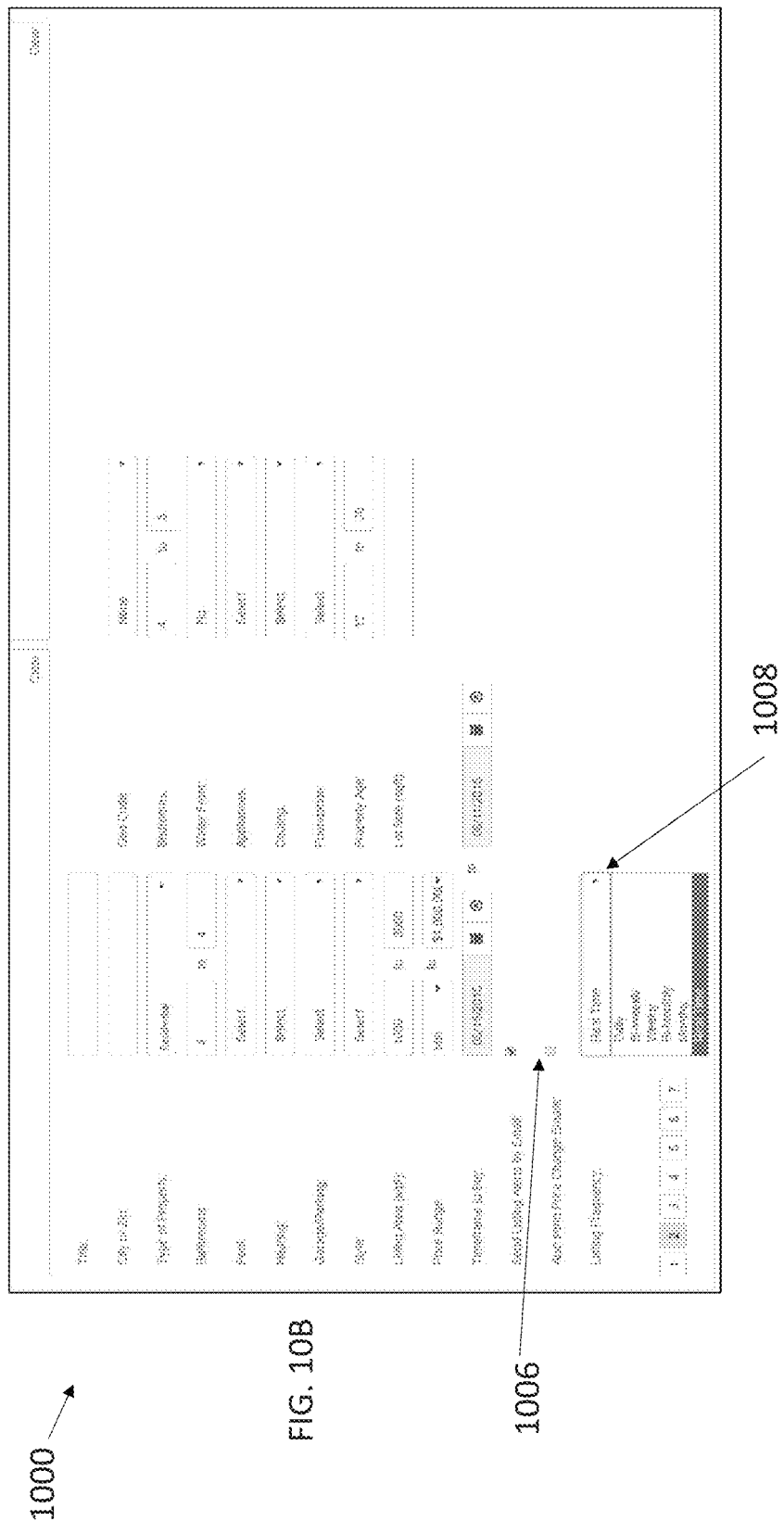

FIGS. 10A-10B show an example embodiment of a sample user interface webpage diagram 1000 displaying a dropdown window that includes property alert settings. As shown in the example embodiment, users can filter results using many of the same features and functions 1002 as described with respect to FIG. 6B. Additionally, users are able to set a timeframe using fields and buttons 1004 in which they plan to purchase the home. They can interact with fields 1006 to have the system send listing alerts by email or price changes by email. They change the frequency with which the system performs searches and sends notifications using field 1008

The example embodiment shown in FIGS. 10A-10B can be used to implement a property alert setup processes, also called Listing alerts, can be useful in several instances. If a user accesses a web search portal but receives zero results based on their entered criteria requirements they can set future alerts if they are interested in finding out whether properties that match their criteria choices appear on the market.

In general, criteria such as constraints on commute time, schools, lifestyle, bedrooms, baths, price, floorplan, and others selected by the user can be stored by the system. These constraints can be saved before the system runs a continual or periodic searching service that acts as a watchdog and sends out an alert for any properties that appear on the market meeting the user selected requirements. In some embodiments, alerts can be sent to a user as a text message, multimedia message, email, phone call, fax, and can be logged and maintained in a database. In some embodiments, user constraints on all variables in databases, such as SQL databases can be used as a basis for incremental phases of subsequent searches.

Some embodiments of systems methods described herein can make real time API calls to multiple data sources, including external databases, but can cause speed issues based on rendering massive data amounts to a large user base.

It should be understood that the systems and methods described herein can be applied to many different industries and have wide ranging benefits. Examples of online portals that can benefit from the features disclosed herein include: Lender sites, Property Rental Sites, Vacation home sites, commercial real estate, Timeshare, Foreclose and REO (bank owned) sites, travel sites, hotel sites, time share sites, and any other websites where users may have a plurality of desired criteria. As an example, these features can be used for travel sites so that users can benefit from the consideration of hotels or vacation rentals close to certain shopping, schools, attractions, nightlife or noise level amounts, in addition to room rates and other criteria.

FIGS. 11A-11D show an example embodiment of a sample user interface webpage diagram 1100 displaying a commute information display. As shown in the example embodiment, when a user has selected a particular property, they are able to view property information 1102, such as address and price. They can select various informational buttons 1104 that perform a variety of functions including Locate on Map, Commute Times, Estimate Renovation Cost, Sun Number Score, Property Details, School Information, Demographics, and others. If the user has a particular job location or other location to which they commute frequently, they are able to toggle between directional buttons 1106, where they can calculate time from one location to the other. Address entry fields 1108 allow users to change one or both addresses. Timeline display 1110 shows a graph of time spent commuting versus time of day. Information field 1112 shows information related to the distance and average time between the selected locations. When selected, user action buttons 1114 can allow users to Arrange for Showing, Request Information, Email Listing, Back to Search Results, Favorite, Print, Share, or perform other actions.

Figure 11A:
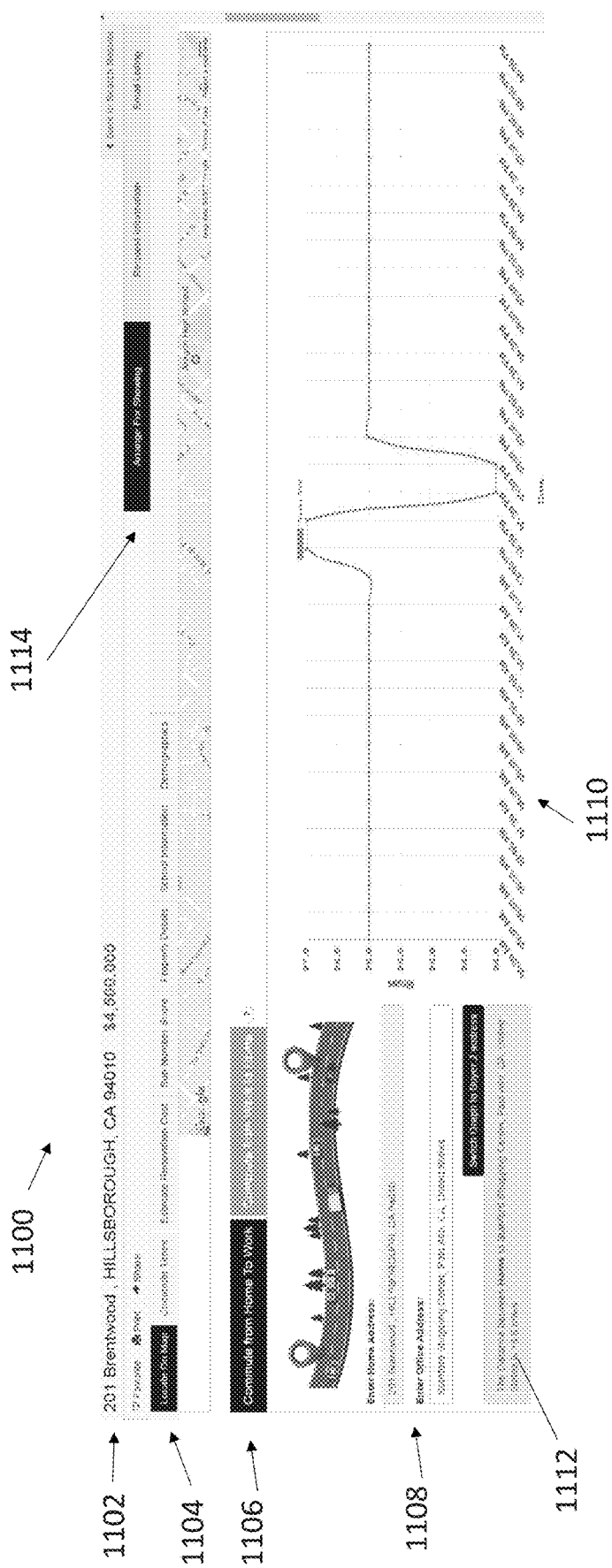
FIGS. 11A-11D show an example embodiment of a sample user interface webpage diagram displaying commute information based on different user input conditions.

As shown in FIG. 11A, timeline display 1110 shows a graph of time spent commuting versus time of day with a time of commute from a first location to a second location of about twenty-eight minutes, but spikes between 11:30 am and bottoms out between 12:30 pm and 2 pm.

Figure 11B:
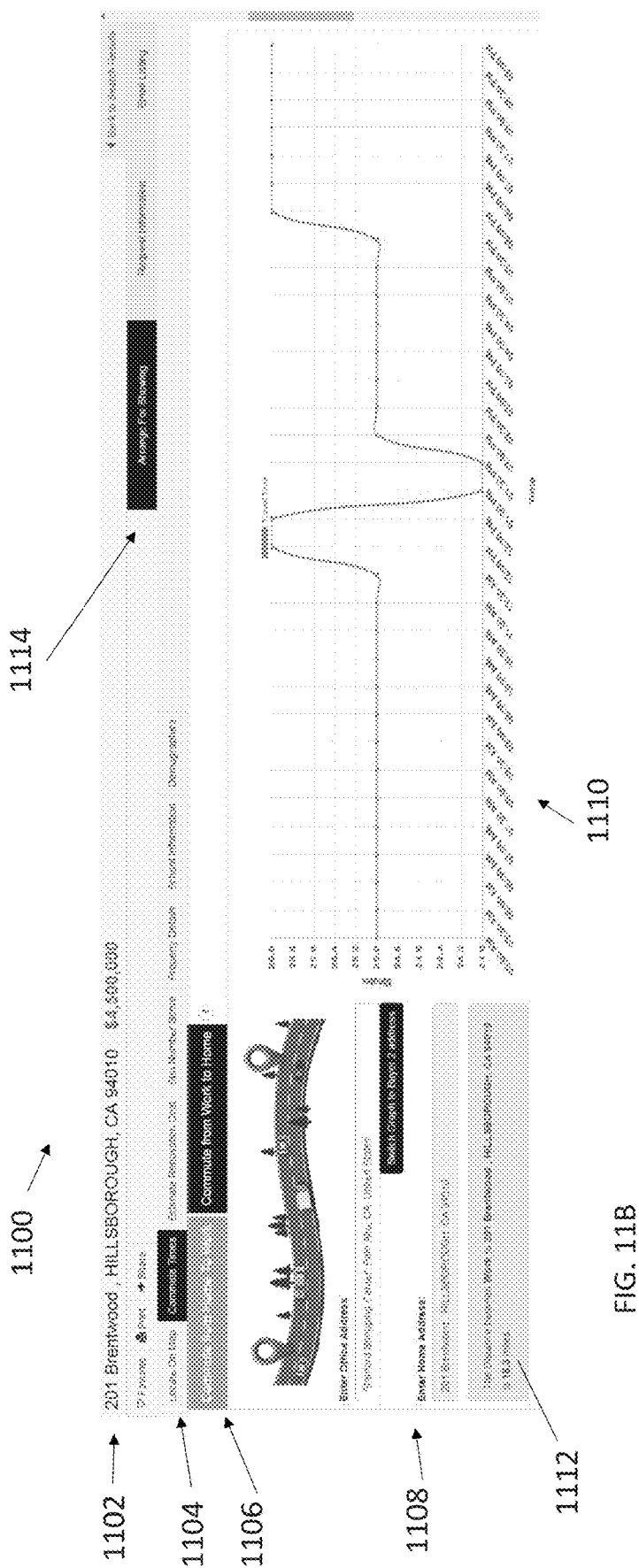

In FIG. 11B, where the user has reversed the directions, the time of commute from the second location to the first location averages about twenty-eight minutes, but spikes between 11:30 am and bottoms out between 12:30 pm and 3 pm. It also spikes again between 5:30 pm and 9 pm.

Figure 11C:
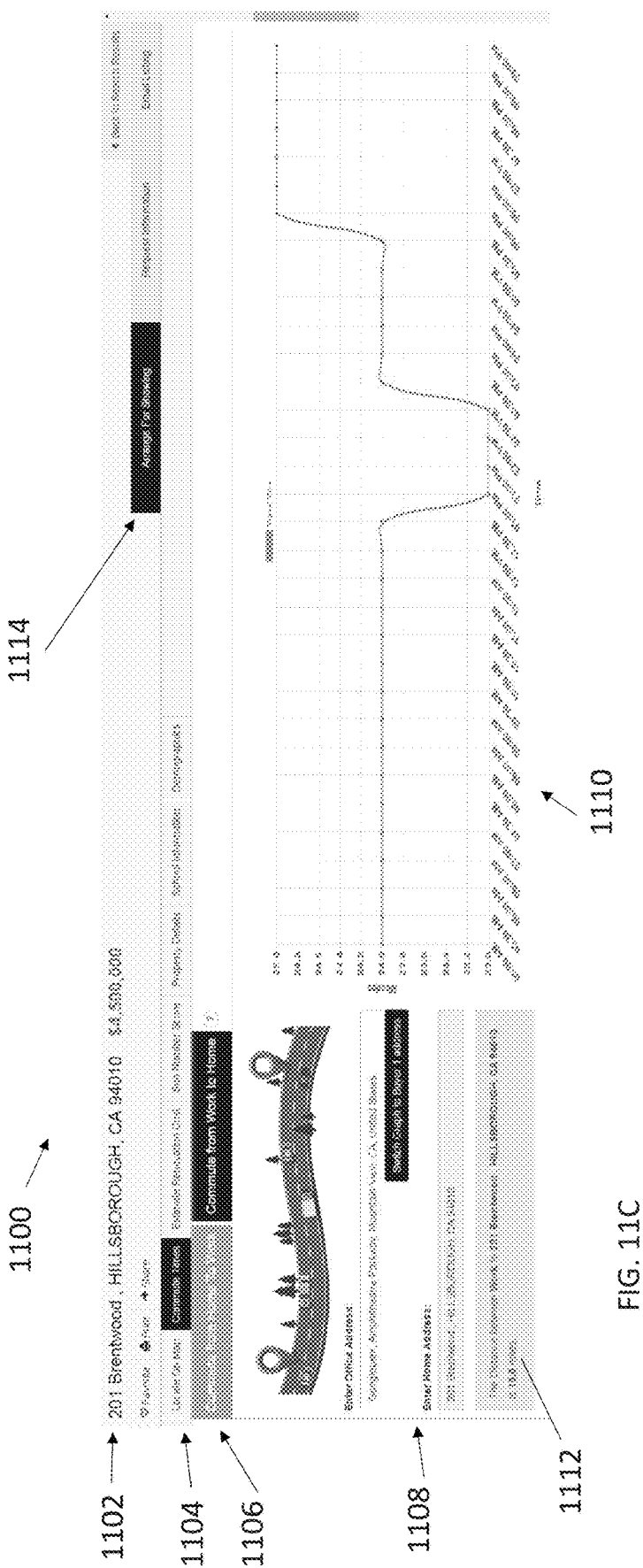

In FIG. 11C, timeline display 1110 shows the user has searched for commute time from a third location to the first location. The time of commute from the third location to the first location averages about twenty-four minutes, bottoms out between 12:30 pm and 3 pm, and plateaus at twenty-four minutes again from 5 pm to 5:30 pm, increases between 5:30 to 6 pm, plateaus from 6 pm to 6:30 pm at 25 minutes, increases from 6:30 pm to 7 pm, plateaus from 7 pm to 7:30 pm at 26 minutes, decreases from 7:30 pm to 8 pm, plateaus from Bpm to 8:30 pm at 25 minutes, and decreases again between 8:30 pm and 9 pm.

Figure 11D:
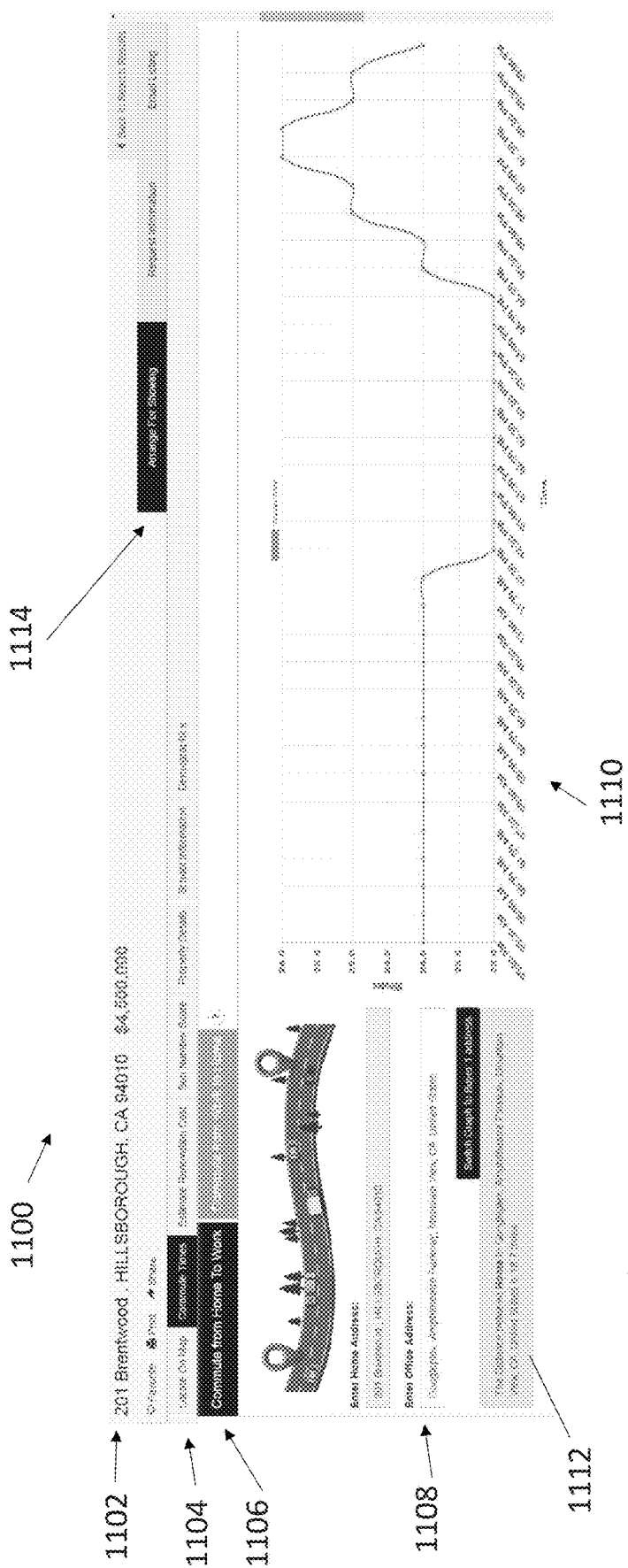

In FIG. 11D, timeline display 1110 shows the user has searched reversed the commute time search of FIG. 11C from the first location to the third location. The time of commute from the first location to the third location averages about twenty-four minutes, bottoms out between 11:30 am and 3 pm, and spikes from 5:30 pm to 9 pm.

Figure 12:
FIG. 12 shows an example embodiment of a sample user interface webpage diagram displaying a utility information display.

FIG. 12 shows an example embodiment of a sample user interface webpage diagram 1200 displaying a utility information display. As shown in the example embodiment, when a user has selected a property, they are able to view property information 1202, such as address and price. They can select various informational buttons 1204 that perform a variety of functions including Locate on Map, Commute Times, Estimate Renovation Cost, Sun Number Score, Property Details, School Information, Demographics, and others. A projected utility score graphic 1206, can be a meter that shows a projected utility score based on property features, location, user inputs and other information. Here, graphic 1206 is a meter with values form 1-100 and the selected property has a value of 26. Utility score value information 1208 shows a projected total per year and can also be broken down by month or in other logical fashion.

A "Number of Occupants" user input area 1210 can be a slider, selectable value, radio buttons, drop down menu, or other data input. Here, the user has selected that there will be 3 occupants of the property, which can be used to calculate projected utility costs. A thermostat user input area 1212 can similarly allow a user to input one or more values of what temperature they plan to keep the house at. In the example embodiment, the user has different summer and winter settings inputted into the display. An occupied home toggle button 1214 allows users to select whether the home will be occupied during the day. Information from 1210, 1212, 1214, and other sources can be used to calculate the value displayed at 1208.

Also shown is a utility breakdown panel 1216. Panel 1216 shows a breakdown of estimated cost on a per utility basis. Here this includes electricity bill, natural gas bill, and water and sewer bill. Information displayed in the example embodiment includes monthly, yearly, and peak bills for each utility. These can also be recalculated and displayed if users modify inputs. When selected, user action buttons 1218 can allow users to Arrange for Showing, Request Information, Email Listing, Back to Search Results, Favorite, Print, Share, or perform other actions.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. An online single-pass property listing data acquisition and visualization method, comprising instructions stored in non-transitory computer readable memory of a server that is communicatively coupled to a computer network, and that when executed by a processor of the server, cause the server to perform the steps of the method, the steps comprise:

requesting, via the network, updated information from at least one property listing database, wherein a request for updated information comprises a commuting information, a first timing information for a first route between a first location and a second location, wherein the timing information comprises a projected commute time length based on recently updated vehicular traffic conditions, and wherein the commuting information comprises a second timing information for a second route between a third location and the second location;

upon receipt of the updated information, storing the updated information in a master database coupled with the server;

upon receipt of a request for property listing information, including at least one property filtering criteria and lifestyle filtering criteria from a user device via the network, requesting dynamic real-time traffic data associated with the property listing information;

upon receiving a dynamic real-time traffic data associated with the property listing information, storing the dynamic real-time traffic data associated with the property listing information in the master database;

searching the master database for results matching both the property filtering criteria, lifestyle criteria and the dynamic real-time traffic data using a single-pass optimization process; and sending the results to the user device via the network for display wherein the displayed results include at least one real-time polygon overlay, wherein sending the results to the user device comprises:

sending results data that causes the user device to selectively display:

a map, a first polygon overlay on the map representing the first timing information, and a second polygon overlay on the map representing the second timing information, wherein the first polygon overlay and the second polygon overlay at least partially intersect and the intersection includes at least one indicator representing a location of the second location.

2. The online single-pass property listing data acquisition and visualization method of claim 1, wherein the at least one lifestyle filtering criteria further comprises neighborhood information about:
  culture, property convenience, aesthetics, demographics, activities, health, safety, pet friendliness, and shopping.

3. The online single-pass property listing data acquisition and visualization method of claim 1, wherein the request for property listing information further comprises:
  noise information.

4. The online single-pass property listing data acquisition and visualization method of claim 1, wherein the request for property listing information further comprises:
  cost of living information.

5. The online single-pass property listing data acquisition and visualization method of claim 1, wherein the timing information comprises:
  a projected commute time length based on recently updated vehicular traffic conditions.

6. The online single-pass property listing data acquisition and visualization method of claim 1, wherein the request for property listing information further comprises:
  cost of total ownership information.

7. An online single-pass property listing data acquisition and visualization system, comprising:
  a server operably coupled to a computer network;
  a property listing database coupled to the computer network;
  a first informational database; and
  wherein a processor of the server is operable to selectively request updated discrete property listing information from the property listing database and updated continuous information from the first informational database, aggregate the information for a plurality of property listing records, search the property listing records for results matching queries received from user devices via the network, and respond to the queries with matching results for display at the user devices, wherein the updated continuous information includes a dynamic real-time traffic data associated with the property listing information, the dynamic real-time traffic data comprises a commuting information, a first timing information for a first route between a first location and a second location, wherein the timing information comprises a projected commute time length based on recently updated vehicular traffic conditions, and wherein the commuting information comprises a second timing information for a second route between a third location and the second location, and wherein the displayed results include a map,
  a first polygon overlay on the map representing the first timing information, and
  a second polygon overlay on the map representing the second timing information,
  wherein the first polygon overlay and the second polygon overlay at least partially intersect and the intersection includes at least one indicator representing a location of the second location.

8. The online single-pass property listing data acquisition and visualization system of claim 7, wherein the first informational database is one of:
  a school information database, a lifestyle information database, a cost of living database, a map database, or a cost of ownership database.

9. The online single-pass property listing data acquisition and visualization system of claim 7, wherein a first query from a user device comprises:
  a first constraint.

10. The online single-pass property listing data acquisition and visualization system of claim 9, wherein the first query from a user device further comprises:
  a second constraint.

11. The online single-pass property listing data acquisition and visualization system of claim 10, wherein the first constraint represents a physical property listing detail and the second constraint represents a neighborhood detail related to the neighborhood around the property.

12. The online single-pass property listing data acquisition and visualization system of claim 11, wherein the neighborhood detail further comprises:
  commuting information, school information, lifestyle information, cost of living information, traffic information, or cost of ownership information.

* * * * *